(12) United States Patent
Hayashi et al.

(10) Patent No.: US 7,065,472 B2
(45) Date of Patent: *Jun. 20, 2006

(54) SYSTEM FOR AIDING THE PREPARATION OF OPERATION AND MAINTENANCE PLANS FOR A POWER GENERATION INSTALLATION

(75) Inventors: Yoshiharu Hayashi, Hitachi (JP); Hidekazu Fujimura, Mito (JP); Masao Furukawa, Jyuo (JP); Katsuhito Shimizu, Hitachi (JP); Yasushi Hayasaka, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/755,292

(22) Filed: Jan. 13, 2004

(65) Prior Publication Data

US 2004/0148132 A1    Jul. 29, 2004

Related U.S. Application Data

(63) Continuation of application No. 10/218,488, filed on Aug. 15, 2002, now Pat. No. 6,691,065, which is a continuation of application No. 09/952,024, filed on Sep. 14, 2001, now Pat. No. 6,853,930.

(30) Foreign Application Priority Data

Feb. 27, 2001 (JP) .............................. 2001-52779

(51) Int. Cl.
*G06F 15/00* (2006.01)

(52) U.S. Cl. .................. 702/184; 702/179; 702/60; 702/182; 73/112; 700/286; 700/108; 705/412; 340/286.01

(58) Field of Classification Search ................. 702/60, 702/179, 182–186, 188; 73/112; 700/108, 700/286; 705/412; 340/286.01; 60/403
See application file for complete search history.

(56) References Cited

U.S. PATENT DOCUMENTS 5,122,727 A * 6/1992 Janssen et al. .............. 323/272

(Continued)

OTHER PUBLICATIONS

Bloom, Representing the Production Cost Curve of Power System Using the Method of Moments, 1991, IEEE, pp. 84-90.*

(Continued)

*Primary Examiner*—Marc S. Hoff
*Assistant Examiner*—Elias Desta
(74) *Attorney, Agent, or Firm*—Crowell & Moring LLP

(57) ABSTRACT

In order to provide an operation and maintenance planning aiding system for a power generation installation which prepares an operation plan for a plurality of power generation units by making use of actual plant data and based on a total judgement including a variety of circumstances of the machine and apparatus or the parts thereof in the power generation units, in the system the plurality of power generation units 41, 42, 51 and 52, a power supply command center 3 and a service center 1 are arranged and connected via a communication network 6, the service center 1 obtains the plant data via the communication network 6 from the plurality of power generation units 41, 42, 51 and 52, calculates in real time a power generation efficiency of a concerned power generation unit for every plurality of power generation units 41, 42 51 and 52 by making use of the obtained plant data and design data of the concerned power generation unit and prepares an operation and maintenance plan for each of the power generation units based on the calculated power generation efficiency.

7 Claims, 17 Drawing Sheets

U.S. PATENT DOCUMENTS

| | | | |
|---|---|---|---|
| 5,371,606 A * | 12/1994 | Katayama et al. | 358/400 |
| 5,621,654 A * | 4/1997 | Cohen et al. | 700/287 |
| 5,761,083 A * | 6/1998 | Brown, Jr. et al. | 364/492 |
| 6,122,603 A * | 9/2000 | Budike, Jr. | 702/182 |
| 2002/0072868 A1 * | 6/2002 | Bartone et al. | 702/62 |
| 2002/0087220 A1 * | 7/2002 | Tveit et al. | 700/22 |
| 2002/0169514 A1 * | 11/2002 | Eryurek et al. | 700/110 |
| 2003/0004659 A1 * | 1/2003 | Hayashi et al. | 702/60 |
| 2003/0216888 A1 * | 11/2003 | Ridolfo | 702/181 |

OTHER PUBLICATIONS

Shumuta, Cost-Effectiveness Model For Renewal Planning of Electric Power Facilities, Jan. 2000, ASCE, pp. 1-6.*

Hara et al., Valuation About Remaining Service Life of GBM Hydraulic Power Plant Units Technical and Economical Aspect, Jul. 1994, IEEE, pp. 804-806.*

Ogilvie et al., 'Use of Data Mining Techniques in the Performance Monitoring and Optimisation of a Thermal Power Plant', May 8, 1998, IEEE pp. 1-4.*

Shumuta, 'Cost-Effectiveness Model for Renewal Planning of Electric Power Facilities', Jan. 2000, PMC2000-037, pp. 1-6.*

Laws, 'Bently Performance TM Software, New Capability and Value for Data Manager 2000', Apr. 2000, pp. 22-25.*

* cited by examiner

FIG. 4

PROCESS VALUE DATA BASE

| POWER PLANT | UNIT | PROCESS No. | PROCESS VALUE | | | |
|---|---|---|---|---|---|---|
| | | TIME | 12:00:20 | 12:00:19 | 12:00:18 | ... |
| POWER PLANT A | UNIT 1 | PID001 | 100.0 | 99.0 | 99.5 | |
| | | PID002 | 120.0 | 119.0 | 118.0 | |
| | | PID003 | 100.0 | 100.0 | 100.0 | |
| | | ⋮ | | | | |
| | UNIT 2 | | | | | |

FIG. 5

DESIGN INFORMATION DATA BASE

| POWER PLANT | UNIT | MACHINE (MANUFATURER/TYPE) | PARTS (MANUFACTURER/TYPE) |
|---|---|---|---|
| POWER PLANT A | UNIT 1 | GAS TURBINE(A Co./GT001) | COMBUSTOR(B Co./CB003) |
| | | | TURBINE(A Co./TB001) |
| | | | COMPRESSOR(A Co./CP001) |
| | | GENERATOR(B Co./GN005) | |
| | | | ⋮ |

| PART | MANUFACTURER/ TYPE | MACHINE MODEL | INPUT OUTPUT SPECIFICATION |
|---|---|---|---|
| COMPRESSOR | A Co./CP001 | MODEL CP001 | INPUT:PID010,PID015,·· <br> OUTPUT:PID030,PID035,·· |
|  | B Co./CP001 | MODEL CP003 |  |
|  | ⋮ |  |  |
| TURBINE | A Co./ TB001 |  |  |

MACHINE MODEL

PERFORMANCE DETERIORATION JUDGEMENT MAKING USE OF MACHINE MODEL

FIG. 10

PERIODIC INSPECTION INFORMATION DATA BASE

|   |   | 1999 | | | | | | | | | | | | 2000 | | | | | | | | | | | |
|---|---|---|---|---|---|---|---|---|---|---|---|---|---|---|---|---|---|---|---|---|---|---|---|---|---|
|   |   | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| A PLANT |   | | | | | | | | | | | | | | | | | | | | | | | | | |
|   | UNIT 1 | | | ■ | | | | | | | | | | | | | ■ | | | | | | | | | |
|   | UNIT 2 | | | | | | ■ | | | | | | | | | | | | | | | | ■ | | | |
| B PLANT |   | | | | | | | | | | | | | | | | | | | | | | | | | |
|   | UNIT 1 | | | | | ■ | | | | | | | | | | | | ■ | | | | | | | | |
|   | UNIT 2 | | | | | | | | ■ | | | | | | | | | | | | | | | | □ | |
| ⋮ |   | | | | | | | | | | | | | | | | | | | | | | | | | |

■ FINISHED   □ PLANNED

FIG. 11

MACHINE INFORMATION DATA BASE

| MACHINE/ PARTS | MANUFACTURER/ TYPE | PURCHASED PRICE | DAYS FOR INSTALLATION |
|---|---|---|---|
| GAS TURBINE | A Co./GT001 | 20000M | 10 DAY |
|   | B Co./GT003 | 16000M | 14 DAY |
|   | C Co./GT001 | 24000M | 8 DAY |
|   | ⋮ | ⋮ | ⋮ |
| ⋮ | ⋮ | ⋮ | ⋮ |

FIG. 12
STRUCTURE OF MATERIAL INFORMATION DATA BASE
THERMAL FATIGUE DAMAGE DATA [GAS TURBINE (GT001)]
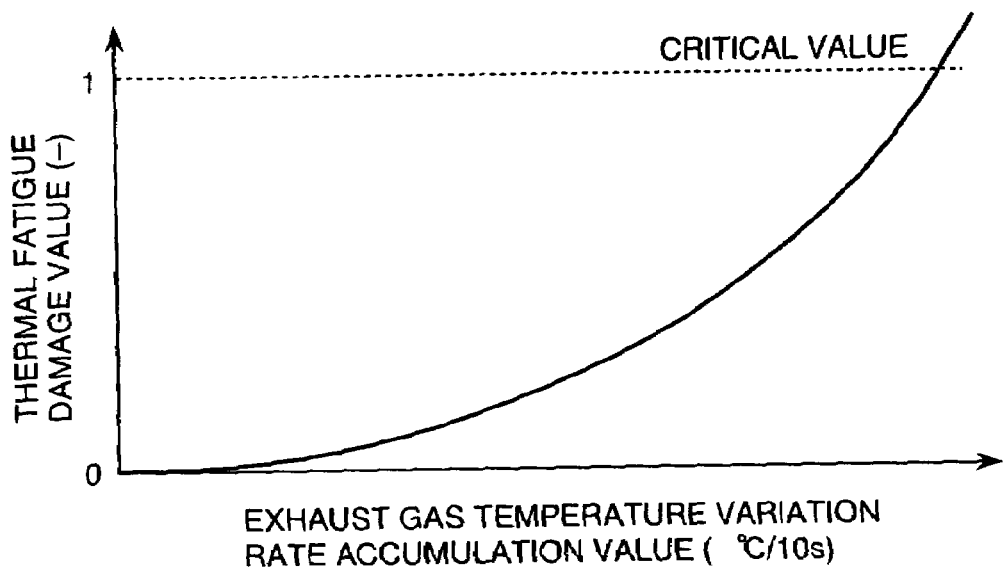
CREEP DAMAGE DATA [GAS TURBINE (GT001)]
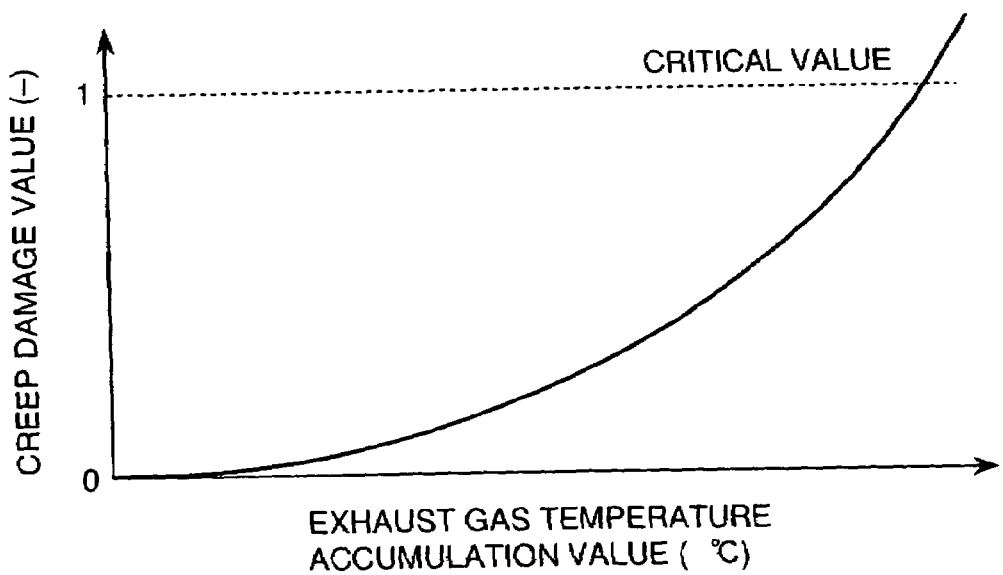

FIG. 13

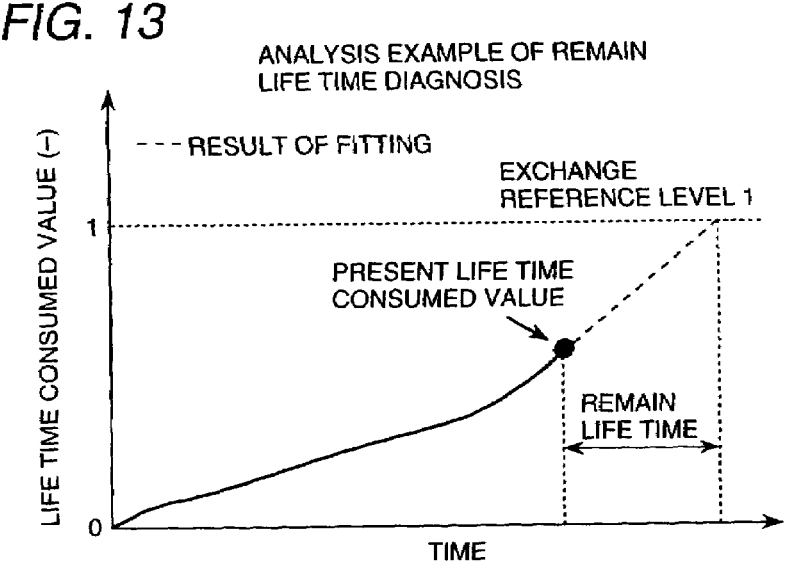

ANALYSIS EXAMPLE OF REMAIN LIFE TIME DIAGNOSIS

FIG. 15  FAILURE INFORMATION DATA BASE

| DATE OF FAILURE OCCURRED | PLANT | UNIT | PARTS (MANUFACTURER/ TYPE) | DATE OF PREVIOUS REPAIR, EXCHANGE | CAUSE OF FAILURE |
|---|---|---|---|---|---|
| 2000.9.10 | PLANT A | UNIT 1 | VALVE (A Co./VL0010) | 1992.3.20 | PACKING DETERIORATION |
| 1998.6.5 | PLANT B | UNIT 2 | PUMP (B Co./PU032) | 1990.4.1 | COUPLING BREAKAGE |
| ⋮ | ⋮ | ⋮ | ⋮ | ⋮ | ⋮ |

FIG. 16  MANUFACTURER INFORMATION DATA BASE

| MANUFACTURER | RELIABILITY | MAINTENANCE CAPACITY |
|---|---|---|
| A Co. | A | A |
| B Co. | A | B |
| C Co. | B | B |
|  | ⋮ | ⋮ |

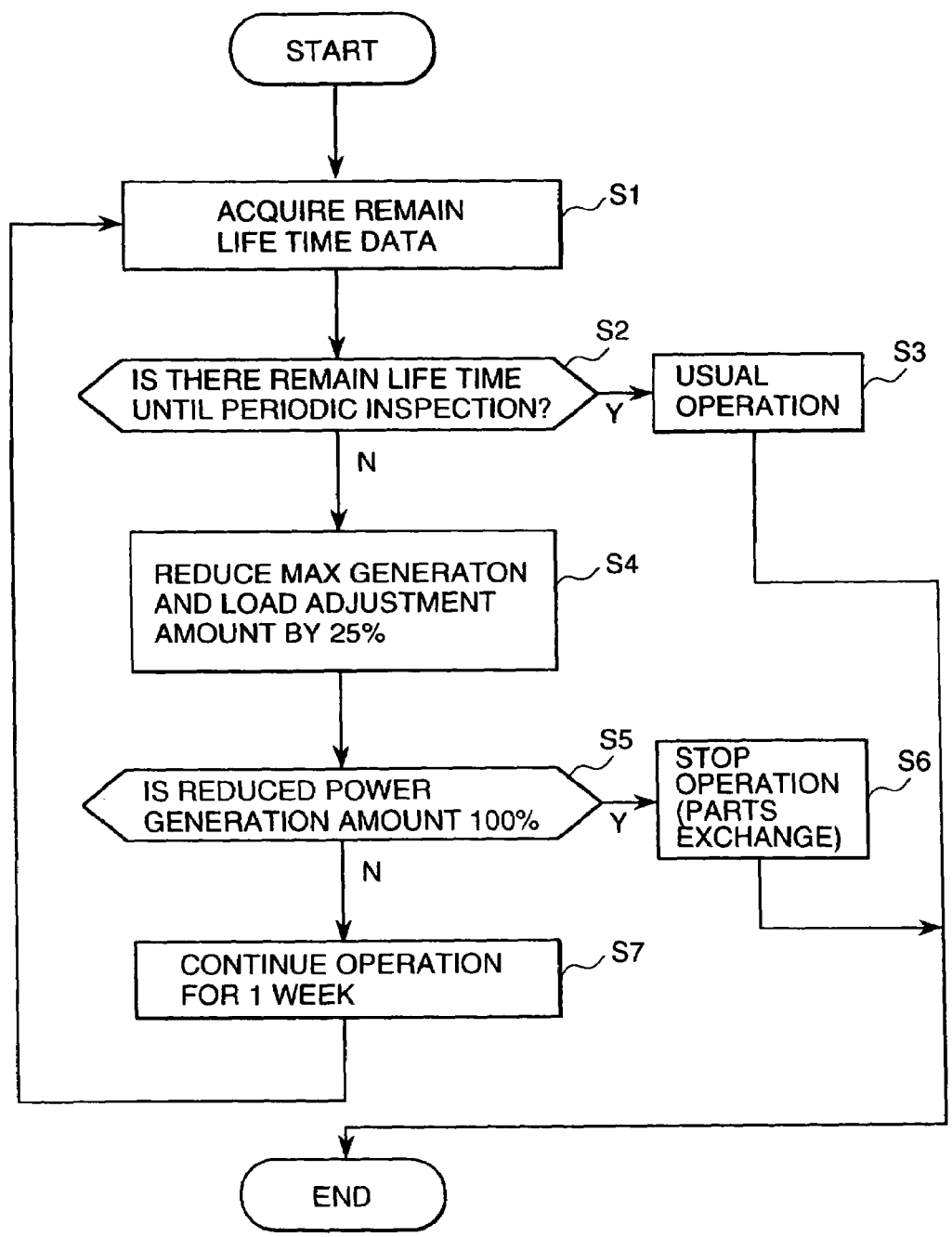

FIG. 21

PROCESS VALUE DATA BASE

| POWER GENERATION Co. | UNIT | PROCESS No. | PROCESS VALUE | | | |
|---|---|---|---|---|---|---|
| | | TIME | 12:00:20 | 12:00:19 | 12:00:18 | ... |
| A POWER GENERATION Co. | UNIT 1 | PID001 | 100.0 | 99.0 | 99.5 | |
| | | PID002 | 120.0 | 119.0 | 118.0 | |
| | | PID003 | 100.0 | 100.0 | 100.0 | |
| | | ⋮ | | | | |
| | UNIT 2 | | | | | |

FIG. 22

DESIGN INFORMATION DATA BASE

| POWER GENERATION Co. | UNIT | MACHINE (MANUFATURER/TYPE) | PARTS (MANUFACTURER/TYPE) |
|---|---|---|---|
| A POWER GENERATION Co. | UNIT 1 | GAS TURBINE(A Co./GT001) | COMBUSTOR(B Co./CB003) |
| | | | TURBINE(A Co./TB001) |
| | | | COMPRESSOR(A Co./CP001) |
| | | GENERATOR(B Co./GN005) | |
| | | ⋮ | |

FIG. 23

PERIODIC INSPECTION INFORMATION DATA BASE

| | | 1999 | | | | | | | | | | | | 2000 | | | | | | | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| A POWER GENERATION Co. | UNIT 1 | | | | ■ | | | | | | | | | | | | ■ | | | | | | | | | |
| | UNIT 2 | | | | | | | | ■ | | | | | | | | | | | | | | ■ | | | |
| B POWER GENERATION Co. | UNIT 1 | | | | | ■ | | | | | | | | | | | | | ■ | | | | | | | |
| | UNIT 2 | | | | | | | ■ | | | | | | | | | | | | | | | | | □ | |

■ FINISHED    □ PLANNED

FIG. 24

FAILURE INFORMATION DATA BASE

| DATE OF FAILURE OCCURRED | POWER GENERATION Co. | UNIT | PARTS (MANUFACTURER/ TYPE) | DATE OF PREVIOUS REPAIR, EXCHANGE | CAUSE OF FAILURE |
|---|---|---|---|---|---|
| 2000.9.10 | A POWER GENERATION Co. | UNIT 1 | VALVE (A Co./VL0010) | 1992.3.20 | PACKING DATRERIO-RATION |
| 1998.6.5 | B POWER GENERATION Co. | UNIT 2 | PUMP (B Co./PU032) | 1990.4.1 | COUPLING BREAKAGE |
| ⋮ | ⋮ | ⋮ | ⋮ | ⋮ | ⋮ |

SYSTEM FOR AIDING THE PREPARATION OF OPERATION AND MAINTENANCE PLANS FOR A POWER GENERATION INSTALLATION

This application is a continuation of application Ser. No. 10/218,488, filed Aug. 15, 2002, now U.S. Pat. No. 6,691,065 which is a continuation of application Ser. No. 09/952,024, filed Sep. 14, 2001 now U.S. Pat. No. 6,853,930.

BACKGROUND OF THE INVENTION

1. Field of the Invention

The present invention relates to a system for aiding the preparation of an operation and maintenance plan for a power generation installation, and, in particular, relates to an operation and maintenance plan preparation aiding system for a power generation installation, in which a service center is provided. The service center manages operation and maintenance of a plurality of power generation units and prepares an operation and maintenance plan for respective power generation units by making use of plant data obtained from the respective power generation units through a communication network.

2. Conventional Art

Generally, many electric power generation companies, which operate an electric power generation business, own a plurality of power generation units. In order to manage the amount of power generated by these power generation units as a whole, comprise respective power generation systems are provided with a power supply command center (central supply) for every electric power generation company. In such power generation systems, the power supply command center assigns and adjusts the power generation amount for every power generation unit in response to power demand from consumers and each of the power generation units performs an operation while maintaining and adjusting the power generation amount assigned by the power supply command center. In such instances, the power supply command center prepares, in view of enhancing economy, an operation plan for the concerned power generation system so as to minimize fuel cost used in the power generation units, and to maximize power generation efficiency. As well, the command center prepares a plan, in view of placing priority on environmental protection, to keep the exhaust gas amount, such as nitrogen oxides and carbon dioxides exhausted from the power generation units, within an allowable range.

Now, the characteristics with regard to power efficiency and the exhaust gas amount which are used as references for the operation planning vary greatly depending on the kinds of fuel used and the power generation methods. With regard to fuels, in case of a thermal power generation, many kinds of fuels such as coal, petroleum and natural gas can be used, therefore, depending on the kind of fuels used, not only the power generation amount per unit fuel cost but also the amount and contents of the exhaust gas vary greatly. Further, with regard to power generation methods, the constitutions of machines and apparatuses of themselves such as power generation by a steam turbine, power generation by a gas turbine and a combined power generation combining thereof affect greatly their power generation efficiency. The power supply command center stores and preserves plant data (data representing the plant characteristics) obtained from these power generation units for every power generation unit, and uses the plant data when preparing operation plans for respective power generation units.

In the above referred to conventional power generation system, although the power supply command center stores and preserves the plant data for every power generation unit, these plant data were limited to the plant data at comparatively early stage of the respective power generation units, such as design values and those at the operation starting period of the power generation plants, however, the plant data varies gradually depending on passage of time as well as the contents of fuel being used, which also varies, therefore, it is difficult to prepare operation plans based on the current plant characteristics of the respective power generation units by making use only of the plant data.

Further, the above referred to conventional power generation system, since the machines and apparatuses such as a gas turbine constituting the power generating unit are always exposed to a high temperature, if load variation to the machines and apparatuses is frequently and repeatedly caused, deterioration of the machines and apparatuses due to thermal fatigue rapidly advances. For this reason, even if a fully economic operation which simply minimizes fuel cost for respective power generation units is employed, when the load variation to the machines and apparatuses is repeated, the lifetime of the machines and apparatuses is shortened, thus quickening the exchange time thereof, and therefore the total cost for the respective power generation units necessary for the plant operation, including the maintenance cost, is not necessarily minimized. Further, in the above referred to conventional power generation system, even if a plurality of power generation units having a high power generation efficiency are positively selected for the operation, when a provability of failure of the machines and apparatuses and the parts thereof constituting the power generation unit concerned is high, an unplanned outage is caused by a failure occurrence in the machines and apparatuses and the parts thereof which possibly causes an economic loss, therefore, even when an operation plan for a plurality of power generation units is prepared only based on fuel cost, the resultant cost was not necessarily minimized.

SUMMARY OF THE INVENTION

The present invention has been achieved in view of the above technical background, and an object of the present invention is to provide a system for aiding in the preparation of an operation and maintenance plan for a power generation installation in which an operation plan for a plurality of power generation units is prepared by making use of actual plant data, and being based on a total judgement, including a variety of circumstances of the machines and apparatuses and the parts thereof in the power generation units.

A first aspect of the present invention is to provide a system for aiding in the preparation of an operation and maintenance plan for a power generation installation in which a plurality of power generation units, a power supply command center and a service center are arranged and connected via communication networks, the service center obtaining plant data from the plurality of power generation units via the respective communication networks. For every power generation unit, the service center calculates power generation efficiency for the concerned power generation units in real time by making use of the obtained plant data and design data of the concerned power generation units and prepares operation and maintenance plans for the respective power generation units based on the calculated power generation efficiency.

According to the first aspect of the present invention, since the operation and maintenance plans for the respective power generation units are prepared in the service center based on the power generation efficiency evaluated and calculated in real time, a secular change and a performance degradation due to failure occurrence for the respective power generation units can be taken into account, thereby, the operation cost thereof can be reduced in comparison with the conventional power generation system in which the operation and maintenance plans for the respective power generation units are prepared by making use of the plant data.

A second aspect of the present invention is to provide a system for aiding in the preparation of an operation and maintenance plan for a power generation installation in which a plurality of power generation units, a power supply command center and a service center are arranged and connected via communication networks, the service center obtains plant data from the plurality of power generation units via the respective communication networks, and for every power generation unit, estimates process values in a machine and apparatus model by making use of the obtained plant data, determines deviation values between the estimated values and measured values, calculates from the determined deviation value a cost of economical loss caused by a power generation efficiency reduction of the concerned power generation unit, and prepares operation and maintenance plans for the respective power generation units through comparison between the calculated cost of economical loss and a cost relating to exchange of the machine and apparatus and the parts thereof in the concerned power generation unit.

According to the second aspect of the present invention, when preparing the operation and maintenance plans for the respective power generation units in the service center based on the power generation efficiency evaluated and calculated in real time, since the cost of economical loss due to the performance degradation is calculated from the deviation value between the process value estimated with the machine and apparatus model and the measured value, the cost of economical loss is compared with the cost relating to the exchange of the machine and apparatus and the parts thereof and the operation and maintenance plan of the respective power generation units are prepared by making use of the comparison result, the total cost for the operation and maintenance can be reduced.

A third aspect of the present invention is to provide a system for aiding in the preparation of an operation and maintenance plan for a power generation installation in which a plurality of power generation units, a power supply command center and a service center are arranged and connected via communication networks. The service center obtains plant data from the plurality of power generation units via the respective communication networks. For every power generation unit, the service center calculates remaining lifetime of the machine and apparatus and the parts thereof in the concerned power generation unit by making use of the obtained plant data and prepares operation and maintenance plans for the respective power generation units by determining exchange time of the machine and apparatus and the parts thereof in the concerned power generation unit based on the calculated remaining lifetime thereof.

According to the third aspect of the present invention, when preparing the operation and maintenance plans for the respective power generation units in the service center based on the power generation efficiency evaluated and calculated in real time, since the operation and maintenance planes are prepared based on the calculated remaining lifetime, an exchange timing of the machine and apparatus and the parts thereof can be determined with high accuracy in comparison with the conventional power generation system in which exchange of the machine and apparatus and the parts thereof is performed with reference to an accumulated operation time thereof, as a result, an abnormality occurrence due to use of the machine and apparatus and the parts thereof exceeding their lifetime and generation of economical loss due to unplanned outages caused by an abnormality of the machine and apparatus and the parts thereof can be prevented, moreover, an exchange at every predetermined period of the machine and apparatus even if there is a remaining lifetime is unnecessitated, thereby, the maintenance cost can be reduced.

A fourth aspect of the present invention is to provide a system for aiding in the preparation of an operation and maintenance plan for a power generation installation in which a plurality of power generation units, a power supply command center and a service center are arranged and connected via communication networks, the service center obtaining plant data from the plurality of power generation units via the respective communication networks and, for every power generation unit, calculating remaining lifetime of the machine and apparatus and the parts thereof in the concerned power generation unit by making use of the obtained plant data, comparing the calculated remaining lifetime with remaining lifetime of the machine and apparatus in the power generation unit determined in the other power generation unit, modifying the operation condition for the machine and apparatus and the parts thereof so as to enhance economy and prolong or shorten the remaining lifetime of the machine and apparatus and the parts thereof in the concerned power generation unit, thereby, preparing the operation and maintenance plans for the respective power generation units.

According to the fourth aspect of the present invention, when preparing the operation and maintenance plans for the respective power generation units in the service center based on the power generation efficiency evaluated and calculated in real time, since the operation condition for the machine and apparatus in its own power generation unit is modified based on the remaining lifetime of the machine and apparatus and the parts thereof not only in its own power generation unit but also in another power generation unit, the operation and maintenance plans can be prepared so that the total cost necessary for the operation and maintenance for the respective power generation units is minimized, the cost merit obtained by the electric power generation by the electric power generation company can be increased in comparison with the conventional power generation system.

BRIEF DESCRIPTION OF THE DRAWINGS

FIG. 4 is a view for explaining storage contents of a process value database as shown in FIG. 3 and shows a structure of the process data;

FIG. 5 is a view for explaining storage contents of a design information database as shown in FIG. 3 and shows a structure of the design information data;

FIG. 10 is a view for explaining storage contents of a periodic inspection database, and shows a structure of the periodic inspection information data;

FIG. 11 is a view for explaining storage contents of a machine and a apparatus database, and shows a structure of the machine and apparatus information data;

FIG. 12 is a view for explaining storage contents of a material information database;

FIG. 13 is a graph obtained by plotting a variation condition of a lifetime consumption value with respect to time;

FIG. 14 is a flow chart showing a processing flow when an operation plan evaluation unit prepares an operation plan by making use of remaining lifetime data;

FIG. 15 is a view for explaining storage contents of a failure information database, and shows a structure of the failure information data;

FIG. 16 is a view for explaining storage contents of a manufacturer information database, and shows a structure of the manufacturer information data;

FIG. 21 is a view for explaining storage contents of another process value database as shown in FIG. 3 and shows a structure of the process data;

FIG. 22 is a view for explaining storage contents of another design information database as shown in FIG. 3 and shows a structure of the design information data;

FIG. 23 is a view for explaining storage contents of another periodic inspection database, and shows a structure of the periodic inspection information data;

FIG. 24 is a view for explaining storage contents of another failure information database, and shows a structure of the failure information data;

DETAILED DESCRIPTION OF THE PREFERRED EMBODIMENTS

Hereinbelow, embodiments of the present invention will be explained with reference to the drawings.

Figure 1:
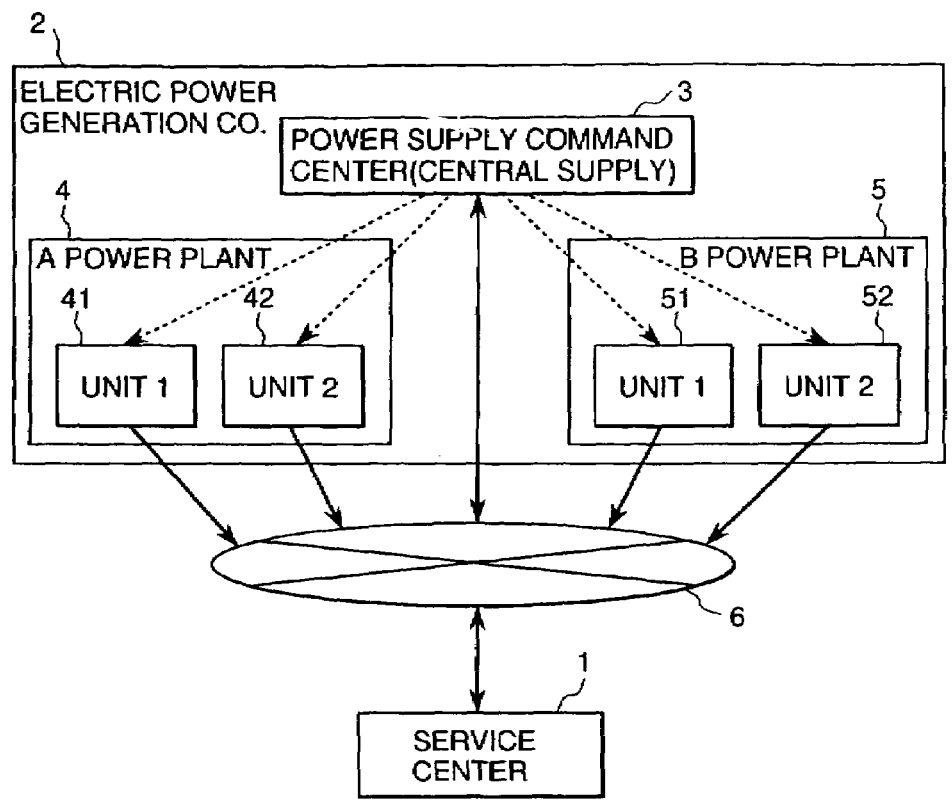
FIG. 1 is a block diagram showing a major constitution of a system for aiding in the preparation of an operation and maintenance plan for a power generation installation representing a first embodiment of the present invention.

FIG. 1 is a block diagram showing a major constitution of a system for aiding in the preparation of an operation and maintenance plan for a power generation installation representing a first embodiment of the present invention.

As shown in FIG. 1, the operation and maintenance plan preparation aiding system for a power generation installation is constituted by a service center 1, which performs the business of preparing an operation and maintenance plan, an electric power generation company 2, which owns two power generation plants 4 and 5, a power supply command center (central supply) 3, which commands power generation output amounts to the two power generation plants 4 and 5 in response to power demand amount, A power generation plant 4 including two power generation units 41 and 42, B power generation plant 5 including two power generation units 51 and 52 and a communication network 6 such as the internet. In the present embodiment, the service center 1, the power supply command center 3, the power generation units 41 and 42, the power generation unit 51 and 52 are selectively connected via the communication network 6.

The electric power generation company 2 requests the service center 1 to prepare an operation and maintenance plan for the power generation units 41 and 42 owned by the A power generation plant 4 and the power generation units 51 and 52 owned by the B power generation plant 5.

Figure 2:
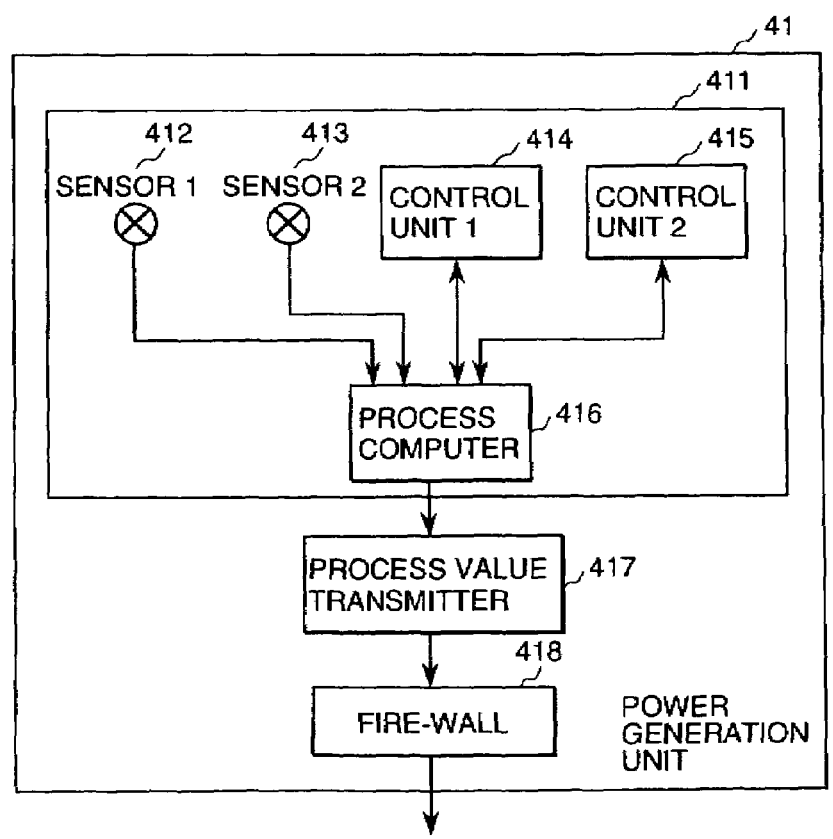
FIG. 2 is a block diagram of an exemplary constitution of a power generation unit as shown in FIG. 1.
Figure 3:
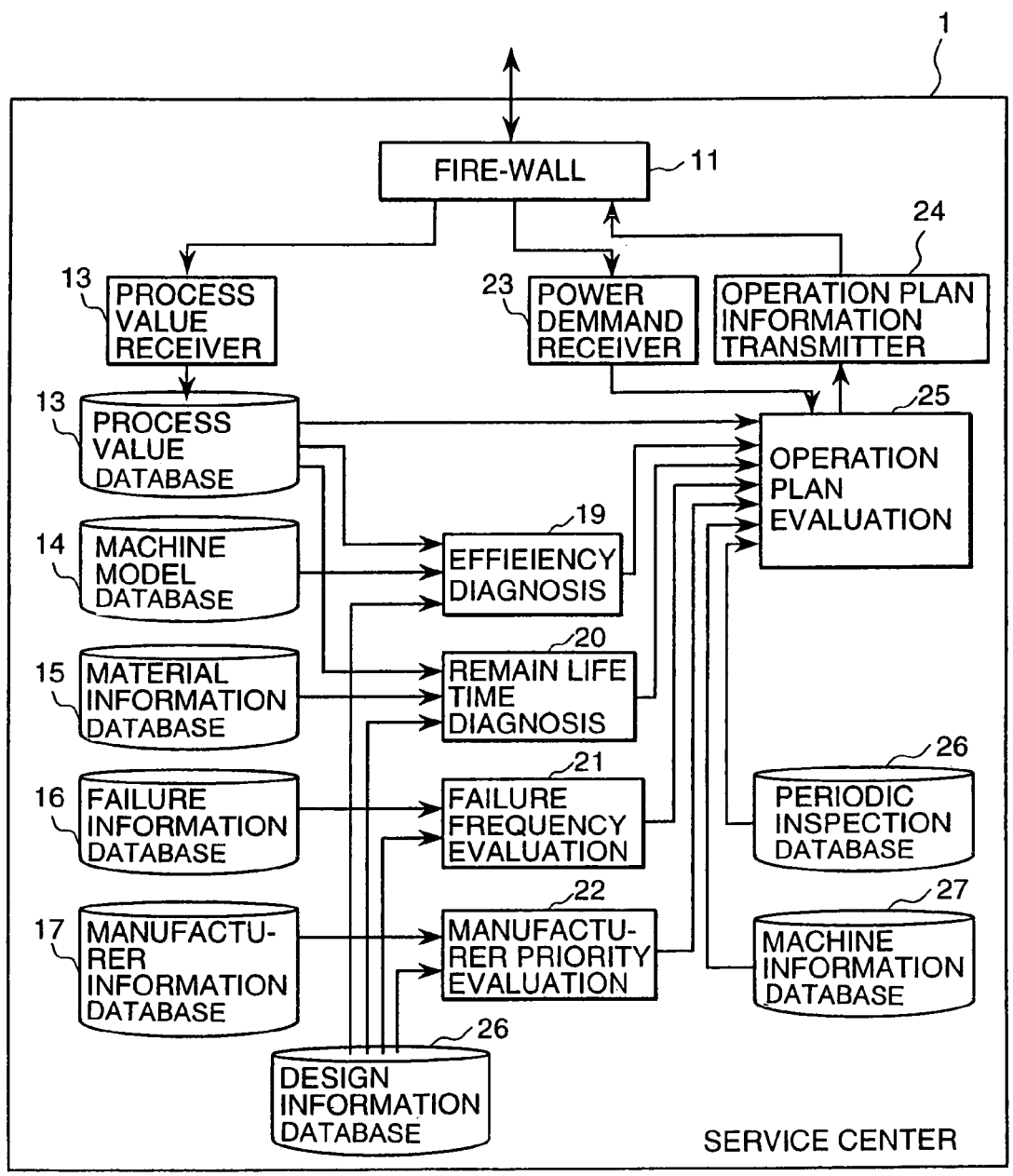
FIG. 3 is a block diagram of an exemplary constitution of a service center as shown in FIG. 1.

Now, FIG. 2 is a block diagram of an exemplary constitution of the power generation unit 41 as shown in FIG. 1, and FIG. 3 is a block diagram of an exemplary constitution of the service center 1 as shown in FIG. 1.

As shown in FIG. 2, the power generation unit 41 includes, at the side of a main body 411 of the power generation unit 41, a first sensor 412 for detecting a first process value, a second sensor 413 for detecting a second process value, a first control unit 414 for controlling a first portion in the main body 411, a second control unit 415 for controlling a second portion in the main body 411 and a process computer 416 for converting the first and second process values into transmission signals, and other than the above is provided with a process value transmission unit 417 and a fire wall 418 for performing communication. In a conventional power generation unit, a process computer has the function of computing processing values detected by the first and second sensors and all of the process values necessary for operating the power generation unit are stored in the database. The process value transmission unit 417 obtains process values from the database in the process computer 416, and transmits the same to the communication network 6 via the fire wall 418. At the moment of transmitting the process values, transmission time information and an ID for specifying the power generation unit are transmitted altogether. Further, in the present embodiment, since the internet is used as the communication network 6, a fire wall 418 is provided in order to prevent unauthorized access to the power generation unit 41 from outside, however, if an exclusive line is used in the communication network 6, the fire wall 418 can be omitted.

Further, as shown in FIG. 3, the service center 1 is constituted by a fire wall 11, a process value receiving unit 12, a process value database 13, a machine and apparatus model database 14, a material information database 15, a failure information database 16, a manufacturer information database 17, a design information database 18, an efficiency diagnosis unit 19, a remaining lifetime diagnosis unit 20, a failure frequency evaluation unit 21, a manufacturer priority evaluation unit 22, an electric power demand amount receiving unit 23, an operation plan information transmission unit 24, an operation plan evaluation unit 25, a periodic inspection information database 26 and a machine and apparatus information database 27, and these elements 11 through 27 are mutually connected as shown in FIG. 3.

In the power generation unit 41, when the process value transmission unit 417 transmits process data, which is transferred via the communication network 6 to the side of the service center 1, the service center 1 obtains via the fire wall 11 the process data, transfers the obtained process data from the process value receiving unit 12 to the process value database 13 and stores the same therein. Further, other process data transferred from other power generation units 42, 51 and 52 are likely stored in the process value database 13.

Herein, FIG. 4 is a view for explaining the storage contents in the process value database as shown in FIG. 3 and shows a structure of the process data.

As shown in FIG. 4, each of the process data is assigned a process number representing ID for discriminating process values for every power generation unit and is managed according to the process number. In the present embodiment, the service center 1 obtains process data in a predetermined cycle from the respective power generation units 41, 42, 51 and 52 and, in the present first embodiment as will be seen from the contents with regard to the time the process data is stored in the process value database 13, the service center 1 obtains the process data in a cycle of 1 sec.

The power supply command center 3 transmits a power demand amount required to be supplied by the electric power generation company 2 as power demand information to the service center 1 via the communication network 6. Since the power demand information varies from time to time depending on power demand, the information is transmitted in a predetermined cycle, for example, every 1 sec. to the service center 1. The service center 1 receives the power demand information via the fire wall 11 at the power demand amount receiving unit 23, and supplies the received power demand information to the operation plan evaluation unit 25. In this instance, the operation plan evaluation unit 25 distributes power generation amounts for the respective power generation units 41, 42, 51 and 52 so that the summed value of the power generation amounts of the respective power generation unit 41, 42, 51 and 52 coincides with the required value, and supplies the distribution result to the operation plan information transmitting unit 24. The operation plan information transmitting unit 24 transmits the operation plan information, namely the power generation amount information distributed to the respective power generation units 41, 42, 51 and 52 to the power supply command center 3 via the communication network 6. The power supply command center 3 confirms the contents of the operation plan information sent from the service center 1 and outputs the command values of the power generation amount for the respective power generation units 41, 42, 51 and 52 according to the operation plan information.

The explanation until now relates to operation planning in response to power demand which varies from time to time in the operation and maintenance plan preparation aiding system for a power generation installation, however, other than the above, the present operation and maintenance plan preparation aiding system for a power generation installation also prepares a long term operational plan. For example, the system prepares such maintenance plans in which, based on the plant data obtained on-line, conditions of the machine and apparatus and the parts thereof in the power generation units are judged, such that disassembling and inspection of the power generation units and exchanging of the parts thereof are performed according to the judgement result, and the timing of the periodic inspection of the power generation units is adjusted.

The above is an outline of the service which the service center 1 provides to the electric power generation company 2.

Hereinbelow, details of processing steps performed by the service center 1 for preparing the operation and maintenance plan will be explained.

The service center 1 uses power generation efficiency in the respective power generation units as one of the parameters for preparing the operation plan. Hereinbelow, the processing for calculating the power generation efficiency will be explained.

In the service center 1 as shown in FIG. 3, the evaluation of the power generation efficiency is performed at the efficiency diagnosis unit 19, which investigates models of the machine and apparatus constituting the power generation unit with reference to the design information database 18.

FIG. 5 is a view for explaining the storage contents of the design information database 18 as shown in FIG. 3, and shows the structure of the design information database.

As shown in FIG. 5, the design information data are constituted by machines and apparatus and parts thereof constituting the respective power generation units and their supplying manufacturers and types for every machine, apparatus and part. For example, in the case of a first power generation unit (power generation unit 1) in power plant A, a product of A company of type GT001 is employed as a gas turbine, and as parts constituting the gas turbine, a combustor of B company of type CB003, a turbine of A company of type TB001 and a compressor of A company of type CP001 are employed.

Further, the efficiency diagnosis unit 19 refers to a machine and apparatus model in the machine and apparatus model database 14 in order to calculate the power generation efficiency.

Figures 6, 7:
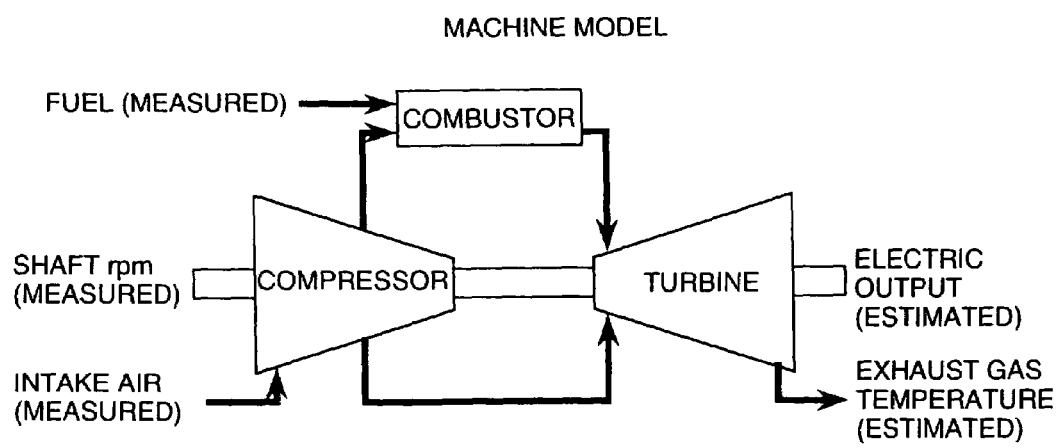
FIG. 6 is a view for explaining storage contents of a machine and apparatus model database and shows a structure of the machine and apparatus model data.
FIG. 7 is a view for explaining a schematic constitution of a gas turbine.

FIG. 6 is a view for explaining the storage contents in the machine and apparatus model database 14 and shows the structure of the machine and apparatus data.

As shown in FIG. 6, the machine and apparatus model data are constituted by parts or types and machine and apparatus model for every part and type, and the substance of the machine and apparatus model is a program operable on a computer. Further, each of the machine and apparatus model data is provided with a process number for the process value serving as an input and output of the program for every machine and apparatus model.

The efficiency diagnosis unit 19 causes the program to operate according to the input and output specifications stored in the machine and apparatus model database 14.

Now, processing steps which perform the efficiency diagnosis by making use of the machine and apparatus model will be explained.

FIG. 7 is a view for explaining an outline constitution of a gas turbine. As shown in FIG. 7, a gas turbine is constituted by a compressor, a combustor and a turbine. Between these elements air, combustion gas or fuel flows. For example, when the machine and apparatus model as shown in FIG. 7 is constituted by a combination of machine and apparatus models of the compressor, combustor and turbine stored in the machine and apparatus model database 14, a performance of the gas turbine as a whole can be calculated by calculating the performances of the respective machine and apparatus models. Namely, as shown in FIG. 7, when measured values such as fuel, shaft rpm, flow rate of intake air and temperature are set at the inputs of the machine and apparatus model, then values such as electrical power output and exhaust gas temperature to be output under the set conditions can be estimated. The calculation is performed under the precondition that the respective machine and apparatus models are operated normally. Therefore, when a deviation is caused between the estimated value determined by making use of machine and apparatus models and the actually measured value obtained from the plant data, it can be judged that the power generation unit generating such plant data is deviating from a normal condition.

Figure 8:
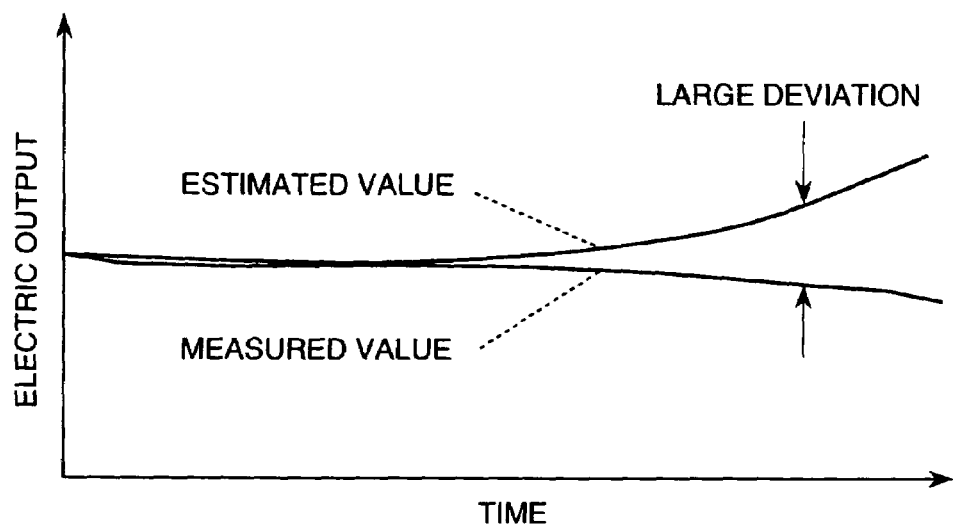
FIG. 8 is a characteristic diagram showing a secular change of an electric power output between an estimated value using a machine and apparatus model and an actually measured value obtained from a power generation unit.

FIG. 8 is a characteristic diagram showing a secular change of an electric power output between the estimated value using a machine and apparatus model and the actually measured value obtained from a power generation unit, wherein the ordinate represents electrical power output and the abscissa represents time.

As shown in FIG. 8, at the early stage the estimated value and the actually measured value substantially coincide, however, depending on the elapsed time, the deviation value between the estimated value and the actually measured value increases, which implies that deterioration of the gas turbine in the concerned power generation unit advances to decrease the performance thereof and no output according to one design can be obtained anymore from the concerned power generation unit. In the present example, total performance of the gas turbine has been calculated, however, performance of the individual machines such as the compressor, combustor and turbine can be calculated for the evaluation. In such instance, a part whose performance is decreasing can be specified, which is effective for identifying the causes of failure.

The efficiency diagnosis unit 19 converts the performance calculation result determined by means of the machine and apparatus models into power generation cost and compares the same with the power generation cost determined from the actual measurement value from the plant data.

Figure 9:
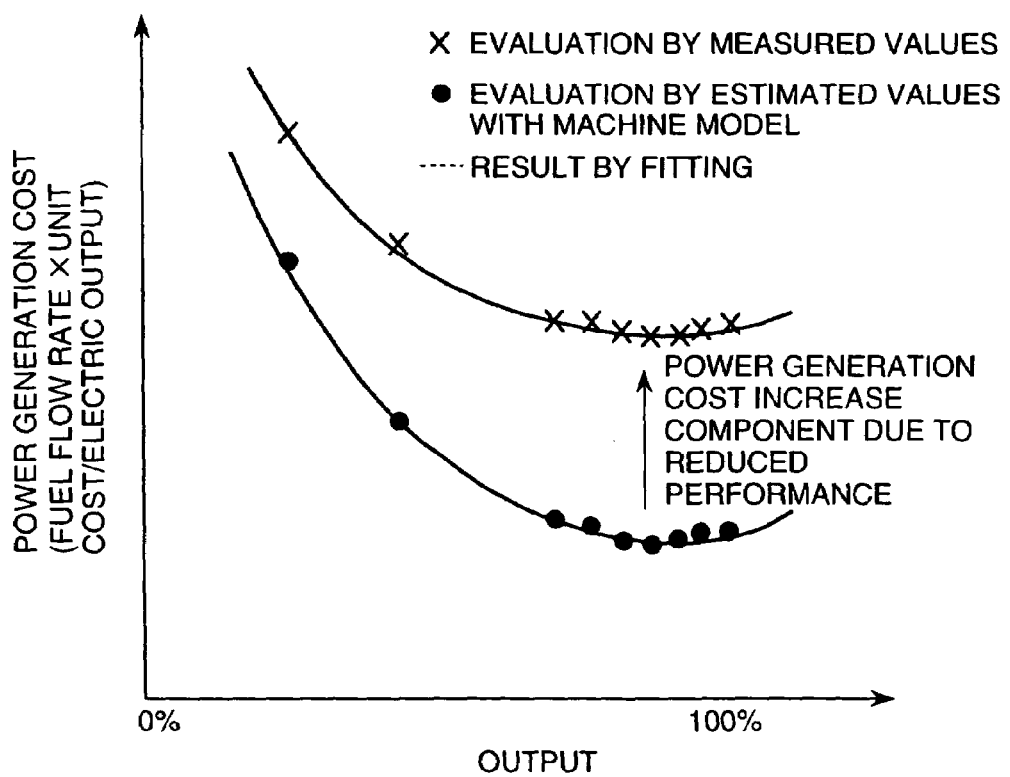
FIG. 9 is a characteristic diagram showing an analysis example of an efficiency diagnosis performed in an efficiency diagnosis unit.

FIG. 9 is a characteristic diagram showing an analysis example of efficiency diagnosis performed in an efficiency diagnosis unit 19; wherein the ordinate represents power generation cost and the abscissa represents output, and further wherein evaluation of the estimated value by means of the machine and apparatus models and evaluation of the actually measured value obtained from the plant data are shown in comparison.

In FIG. 9, the power generation cost is defined as a fuel cost necessary for outputting a unit power generation amount and the fuel cost is determined in a predetermined time interval (for example, every one hour). Further, in the evaluation based on the actually measured value in FIG. 9, the power generation cost is calculated by making use of the electrical power output and fuel flow rate stored in the process value database 13 and the fuel cost obtained in advance, in that the power generation cost is calculated by multiplying the fuel cost by the fuel flow rate and dividing the multiplied result by the electric power output. On the other hand, in the evaluation based on the estimated value by means of the machine and apparatus models in FIG. 9, the power generation cost is determined by making use of the fuel flow rate of the actually measured value and the electrical power output of the estimated value by means of the machine and apparatus models. When plotting the respective power generation costs determined according to both methods for every load, and if the performances of the machines and apparatuses are those as designed, the two plotted lines will coincide. The example as shown in FIG. 9 shows a case where the power generation cost increases due to performance deterioration of machines and apparatuses.

Subsequently, the preparation of the operation and maintenance plan by making use of the power generation cost calculated in the efficiency diagnosis unit 19 is performed in the operation plan evaluation unit 25. Hereinbelow, the processing performed in the operation plan evaluation unit 25 will be explained.

The operation plan evaluation unit 25 uses the power generation costs determined on-line for the respective power generation units 41, 42, 51 and 52, and prepares a plan from an economic point of view so as to positively operate a power generation unit or units having a lower power generation cost among the power generation units 41, 42, 51 and 52. For example, in the power generation unit 41 among the power generation units 41, 42, 51 and 52, if deterioration of, for example, the gas turbine among its constituting machines and apparatus advances and the efficiency thereof decreases, a deviation is caused between the power generation cost based on the actually measured value determined from the process data in the power generation unit 41 and the power generation cost determined from the estimation value by means of the machine and apparatus models as explained above. In such instance, the operation plan evaluation unit 25 evaluates the economic loss due to the performance deterioration according to the following equation (1);

$$L1 = C \times A \times D1 \quad (1)$$

wherein,

L1: Economic loss due to performance deterioration (¥)

C: Power generation cost increase component due to the performance deterioration (¥/MWd)

A: Power generation amount (actual resultant value) per day (MWd/day)

D1: Remaining days until subsequent periodic inspection (days).

In the equation (1), the power generation amount A per day is determined by averaging the cumulative electric power output amount in respective operation days. When multiplying the power generation amount A per day with the remaining days D1 until the periodic inspection, an estimated possible power generation amount until the periodic inspection can be calculated. Information with regard to a plan on the periodic inspection is stored in the periodic inspection information database 26.

FIG. 10 is a view for explaining storage contents of a periodic inspection database 26, and shows a structure of the periodic inspection information data.

As shown in FIG. 10, the periodic inspection information data are information representing periodic inspection times already performed in the past and periodic inspection times to be performed in the future, and based on the periodic inspection information data the remaining days until the subsequent periodical inspection is calculated. The economic loss (L1) due to performance deterioration can be calculated by multiplying the estimated power generation amount (A×D1) until the subsequent periodic inspection by the power generation cost increase component (C).

Subsequently, the operation plan evaluation unit 25 judges, in view of the total cost incurred for the operation and maintenance, whether operation of one power generation unit, for example, the power generation unit 41 has to be stopped and the machines and apparatuses and the parts thereof have to be exchanged or the operation thereof has to be continued under the performance deteriorating condition. In this instance, the operation plan evaluation unit 25 calculates the cost in association with the change of the machines and apparatuses or the parts thereof with reference to the machine and apparatus information database 27.

FIG. 11 is a view for explaining storage contents of a machine and apparatus database 27, and shows a structure of the machine and apparatus information data.

As shown in FIG. 11, the machine and apparatus information data are constituted by manufacturer and type, purchased price and days necessary for installation work for every machine and apparatus and part thereof. In this instance, the cost in association with the exchange of the machines and apparatuses and the parts thereof is a sum of the current price of the machine and apparatus or the parts thereof in view of depreciation and the loss of electric power sales opportunity because of the power generation stoppage due to the exchange work, and is expressed by the following equation (2);

$$L2 = P \times (1-R) + A \times D2 \times E \qquad (2)$$

wherein,

L2: Economic loss (¥) in association with machine and apparatus/part exchange

P: Purchase price (¥) of exchanging machine and apparatus/parts

R: Consumed lifetime value (normalized value)(–)

A: Power generation amount per day (actual resultant value)(MWd/day)

D2: Days required for installation work (day)

E: Sales price of electric power (¥/MWd).

In the equation (2), with regard to the purchase price (P) of the machine and apparatus and parts, the information stored in the machine and apparatus information database 27 is referred to. The depreciation is evaluated in view of the remaining lifetime and uses the already consumed lifetime (R) as a parameter therefor. The consumed lifetime value (R) is a normalized value, and under a brand-new condition when beginning use, the value is 0 and the value increases depending on the use years and becomes 1 when the exchange level has been reached. Namely, the consumed lifetime value (R) of 1 implies that the concerned machine and apparatus have been used up and no value remains there. A calculation method of the consumed lifetime value (R) will be explained later. Further, with regard to the loss of electric power sales opportunity, the power generation amount not generated because of the exchange of the machine and apparatus or the parts thereof can be calculated by multiplying the power generation amount (A) per day by the number of days (D2) required for installation work stored in the machine and apparatus information database 27, and when the electric power sales price (E) is multiplied by the above calculated non-power generation amount, the economic loss in association with the exchange of the machine and apparatus or the parts thereof can be calculated.

The operation plan evaluation unit 25 compares the economic loss (L1) due to the performance deterioration with the economic loss in association with the exchange of the machine and apparatus or the parts thereof. When the performance deterioration of the power generation unit advances and the economic loss (L1) exceeds the economic loss (L2), the operation plan evaluation unit 25 plans to stop the operation of the power generation unit and to exchange the machine and apparatus or the parts thereof, and further plans to compensate the power generation amount decreasing component due to the operation stoppage of the power generation unit with a power generation amount increasing by other power generation unit or units.

Further, the service center 1 uses the remaining lifetime of the machine and apparatus or the parts thereof as one of the parameters for preparing the operation plan. Hereinbelow, the processing of calculating the remaining lifetime will be explained.

In the service center 1, the remaining lifetime diagnosis unit 20 performs evaluation of the remaining lifetime of machines and apparatuses or the parts thereof, and evaluates the remaining lifetime of the power generation unit based on the remaining lifetime evaluation data for the respective power generation units stored in the material information database 15.

FIG. 12 is a view for explaining storage contents of a material information database 15, and shows the structure of the material information data, namely the remaining lifetime evaluation data.

The parts such as the gas turbine, which are subjected to high temperatures during the operation thereof, are caused of thermal fatigue damage induced by thermal stress variation in association with the applied temperature as well as caused of creep damage which advances depending on the height of the applied temperature and duration time thereof. These damages induce damages such as cracks if a predetermined critical value is exceeded and can cause a significant accident.

As shown in FIG. 12, the remaining lifetime evaluation data are constituted by graphs representing accumulation of the thermal fatigue damage and the creep damage in the respective power generation unit (gas turbine). In the graph of the thermal fatigue damage, the ordinate represents normalized thermal fatigue value, and the abscissa represents accumulation value of exhaust gas temperature variation rate for every 10 sec., and it is defined that when the thermal fatigue damage value reaches 1, it is determined that the material endurance with respect to the thermal fatigue damage has reached its critical value. Namely, the accumulation value of the exhaust gas temperature variation rate in the gas turbine is a value obtained in such a manner that after the absolute value difference between the current exhaust gas temperature value and that of before 10 sec. (representing variation rate in 10 sec.) is multiplied by a normalized constant and the multiplication results are added for every 10 sec., therefore, the thermal fatigue damage value simply increases depending on lapse of time.

Further, in the graph representing the creep damage, the ordinate represents normalized creep damage value, the abscissa represents accumulated value of exhaust gas temperature for every 10 sec., and when the creep damage value reaches to 1, the material endurance with regard to the creep damage reaches to a critical value. The creep damage value simply increases depending on lapse of time. The consumed lifetime of a gas turbine is determined by the sum of the thermal fatigue damage value and the creep damage value by taking into account both influences by the thermal fatigue damage and by the creep damage. Namely, the consumed lifetime (R) is determined by the following equation (3);

$$R = H + C \qquad (3)$$

wherein,

H: Thermal fatigue damage value (normalized value)

C: Creep damage value (normalized value).

FIG. 13 is a graph obtained by plotting variation condition of lifetime consumption value with respect to time as determined according to the above processing, and shows an analysis example performed by the remaining lifetime diagnosis unit 19.

The consumed lifetime value of a brand-new gas turbine at the time of installation is 0 and the value gradually increases through repetition of such operations including temperature variation as starting up/stopping and load adjustment in addition to usual operation. In order to evaluate the remaining lifetime of a gas turbine, based on the consumed lifetime until now, a possible consumed lifetime thereafter is extrapolated and estimated according to the mathematical formula representing the consumed lifetime value, and the remaining lifetime is determined by the remaining time until the estimated result reaches to the consumed lifetime value of 1 representing the exchange level.

In the service center 1, the operation plan evaluation unit 25 obtains the remaining lifetime data evaluated by the remaining lifetime diagnosis unit 20 and prepares the operation plan by making use of the obtained remaining lifetime.

FIG. 14 is a flow chart showing a processing flow when an operation plan evaluation unit 25 prepares an operation plan for a certain power generation unit by making use of remaining lifetime data.

The flow chart will be explained with reference to FIG. 14, at first in step S1 the operation plan evaluation unit 25 obtains the remaining lifetime data evaluated by the remaining lifetime diagnosis unit 20 and calculates the remaining lifetime days.

Subsequently, in step S2, the operation plan evaluation unit 25 determines the days until the subsequent periodic inspection for the concerned power generation unit with reference to the periodic inspection information database 26 and judges whether the calculated remaining lifetime days are larger or shorter than the determined days until the subsequent periodic inspection. Then, if it is judged that the remaining lifetime days are longer than the days until the subsequent periodic inspection (Y), the process moves to the next step S3, on the other hand, if it is judged that the remaining lifetime days are shorter than the days until the subsequent periodic inspection (N), the process moves to the next step S4.

Subsequently, in step S3, the operation plan evaluation unit 25 prepares an operation plan for the concerned power generation unit to perform a usual operation and ends the series of processings in the flow chart.

Further, in step S4, the operation plan evaluation unit 25 reduces the maximum power generation amount in the concerned power generation unit by 25% and sets the same at 75% of the current power generation mount, and further reduces the load adjustment amount which varies depending on the power demand by 25% and sets the same at 75% of the current load adjustment amount, and prepares an operation plan which intends to prolong the remaining lifetime of the concerned power generation unit.

In the subsequent step S5, the operation plan evaluation unit 25 judges whether or not the maximum power generation amount in the concerned power generation unit has been reduced by 100%. Then, if it is judged that the maximum power generation amount has been reduced by 100% (Y), the process moves to the subsequent step S6, on the other hand, if it is judged that the maximum power generation amount has not yet been reduced by 100% (N), the process moves to another step S7.

In step S6, the operation plan evaluation unit 25 repeats the process in step S4 four times which will be explained later, even through repeating the processings if the end of the lifetime is reached, the operation plan evaluation unit 25 prepares an operation plan to stop the operation of the concerned power generation unit and ends the series of processings in the flow chart.

Further, in step S7, the operation plan evaluation unit 25 prepares an operation plan which permits the continued operation of the concerned power generation unit for a week. Then, after a week when completing the operation plan, the process returns to step S1 and the operation plan evaluation unit 25 again causes to repeat steps following step S1.

In parallel with the above operation plan, the operation plan evaluation unit 25 prepares an operation plan in which another power generation unit having a higher power generation efficiency is positively selected for operation based on the power generation efficiency of the respective power generation units calculated in on-line. For example, as shown in FIG. 9, if the power generation amount (output) of a power generation unit is reduced, a reduction of the power generation efficiency is caused (in other words cost increase) regardless of the performance deterioration due to abnormality. For this reason, a probability of continuing operation of the power generation unit is reduced of which power generation amount is adjusted to be reduced based on the remaining lifetime. Then, the operation plan evaluation unit 25 prepares a maintenance plan for performing an exchange of the machine and apparatus or the parts thereof for the power generation unit of which operation is judged to be stopped according to the remaining lifetime diagnosis result for the respective power generation units.

The above explanation shows an example in which, when preparing an operation and maintenance plan for power generation units by making use of the remaining lifetime data, deterioration of the machine and apparatus or the parts thereof advances more than that estimated and the exchange timing is hastened. When preparing a usual operation and maintenance plan for power generation units, it is planned based on the remaining lifetime data to exchange the machine and apparatus or the parts thereof at the time of the periodic inspection, however, if the end of the remaining lifetime comes earlier than that estimated because of changes in operational circumstances it is possible to prepare an operation plan which prevents the machine and apparatus or the parts thereof from exceeding their lifetime. Therefore, the operation and maintenance plan aiding system for a power generation installation according to the present embodiment can avoid unpredictable circumstances, which causes unplanned outages of the power generation unit due to an abnormality caused by the use of the machine and apparatus or the parts thereof exceeding their lifetimes, and can also avoid the economic loss caused by the unplanned outage of the power generation unit.

Contrary to the above example, an example can be prepared in which, based on remaining lifetime diagnosis result evaluated in real time, the exchange timing of the machine and apparatus or the parts thereof can be prolonged. For example, since a gas turbine is subjected to a high temperature and the deterioration thereof advances rapidly, an exchange standard time (for example, an accumulated operation time of 50,000 hours) is set in advance, and exchange of the machine and apparatus or the parts thereof is performed during the periodic inspection so as not to exceed the standard time. In such instance, if the remaining lifetime of the machine and apparatus or the parts thereof remains long, it is not necessarily required to exchange the machine and apparatus or the parts thereof when the standard time is reached, and the exchange timing can be extended. In such instance, in comparison with the exchange of the machine and apparatus or the parts thereof with reference to the standard time, the maintenance cost can be reduced.

Further, the service center 1 uses failure frequency of the machine and apparatus as one of the parameters for preparing an operation plan. Hereinbelow, the processing for calculating the failure frequency of the machine and apparatus will be explained.

In the service center 1, the failure frequency evaluation unit 21 evaluates the failure frequency of the machine and apparatus.

FIG. 15 is a view for explaining storage contents of a failure information database 16, and shows a structure of the failure information data.

As shown in FIG. 15, the failure information data show failure histories caused in the respective power generation units, for example, at the first power generation unit in power generation plant A on Sep. 10, 2000 a packing deterioration in an A company manufactured valve of type VL 0010 was caused and the same was repaired and further it is indicated that the same valve was exchanged on Mar. 20, 1992. According to the contents of the failure information data it is understood that the valve has failed after about eight years and six months of use. Similar information is indicated with regard to the pump in the second power generation unit in the power generation plant B.

The failure frequency evaluation unit 21 evaluates with how much probability (once in how many years) a failure of the respective machines and apparatuses or the parts thereof is caused by making use of the data stored in the failure information database 16 and supplies the evaluation result to the operation plan evaluation unit 25.

The operation plan evaluation unit 25 evaluates whether the machine and apparatus or the parts thereof in the respective power generation units can be used without failure up to which periodic inspection timing in the future by making use of the evaluation result supplied from the failure frequency evaluation unit 21 and the reference result of the periodic information database 26. Thereafter, when it is estimated according to the failure probability of the machines and apparatuses or the parts thereof that there are machine and apparatus or the parts thereof which only endures up to the timing of the subsequent periodic inspection, exchange of the machine and apparatus or the parts thereof is planned.

Further, the service center 1 uses a priority of manufacturers as one of the parameters for preparing the operation plan. Hereinbelow, the processing for calculating the priority of manufacturers will be explained.

In the service center 1, the manufacturer priority evaluation unit 22 evaluates priority of manufacturers based on the respective manufacturer information stored in the manufacturer information database 17.

FIG. 16 is a view for explaining storage contents of a manufacturer information database 17, and shows a structure of the manufacturer information data.

As shown in FIG. 16, in the manufacturer information data, with respect to the respective machines and apparatuses or parts thereof, the reliability and maintenance capacity for every manufacturer are evaluated by making use of A, B and C as evaluation references. In this instance, point 10 is assigned for A, point 5 for B and point 0 for C, and by determining the total points the priority of the manufacturers are determined according to the total points.

When the operation plan evaluation unit 25 selects a power generation unit for operation and if the manufacturer priority of the machine and apparatus or the parts thereof used in the power generation unit is high, the operation plan evaluation unit 25 prepares a plan which positively selects the concerned power generation unit for the operation.

As has been explained hitherto, the operation and maintenance plan aiding system for a power generation installation according to the present embodiment uses the performance diagnosis result, the remaining lifetime diagnosis result, the failure frequency and the priority of manufacturers when preparing an operation and maintenance plan for the respective power generation units.

Figure 17:
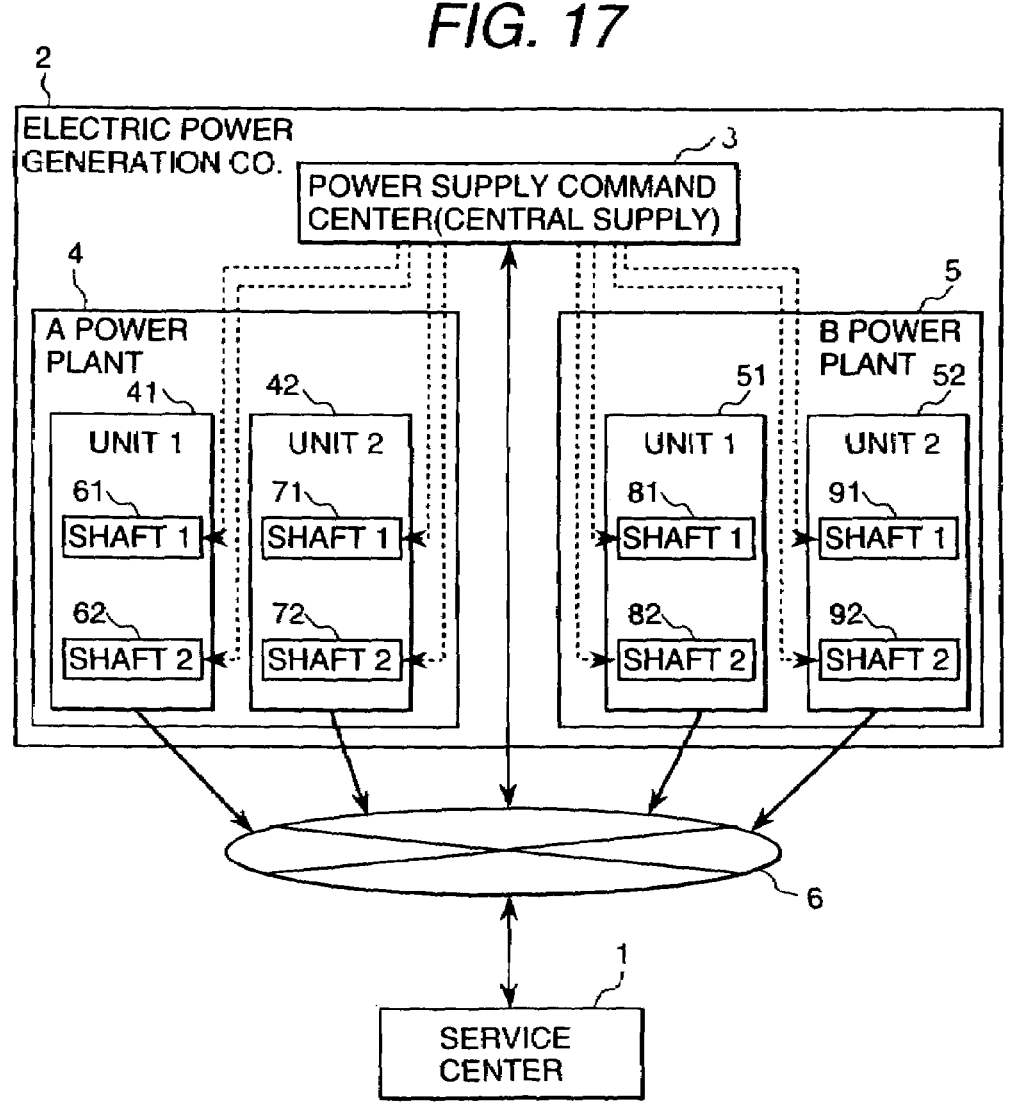
FIG. 17 is a block diagram showing a major constitution of a system for aiding in the preparation of an operation and maintenance plan for a power generation installation representing a second embodiment of the present invention.

FIG. 17 is a block diagram showing a major constitution of a system for aiding in the preparation of an operation and maintenance plan for a power generation installation representing a second embodiment of the present invention.

In the embodiment as shown in FIG. 17, the power generation unit 41 includes two shafts 61 and 62, the power generation unit 42 includes two shafts 71 and 72, the power generation unit 51 includes shafts 81 and 82 and the power generation unit 52 includes shafts 91 and 92, and wherein the power generation amount in the respective power generation units 41, 42, 51 and 52 is adjusted for every shafts 61, 62, 71, 72, 81, 82, 91 and 92. Further, in FIG. 17 the same or equivalent elements as those in FIG. 1 are denoted by the same reference numerals.

In FIG. 17, the shafts 61, 62, 71, 72, 81, 82, 91 and 92 designate rotating shafts for transferring motive power of turbines to generators, and each of the power generation units 41, 42, 51 and 52 includes a plurality of generators and each of the plurality of generators is coupled with one or a plurality of turbines. For such power generation units 41, 42, 51 and 52, when the power generation amount is set for every shafts 61, 62, 71, 72, 81, 82, 91 and 92, namely for every generator, an extremely fine operation and maintenance plan can be prepared. For example, a plan can be prepared such that one of the plurality of shafts 61, 62, 71, 72, 81, 82, 91 and 92 constituting the power generation units 41, 42, 51 and 52 is stopped for operation and the operation of the other shafts is continued In this instance, since the rest of the operation of the system for aiding in the preparation of operation and maintenance plan for a power generation installation of the second embodiment as shown in FIG. 17 is substantially the same as that of the operation and maintenance plan preparation aiding system for a power generation installation of the first embodiment as has already been explained above, the explanation of the operation of the second embodiment is omitted.

Figure 18:
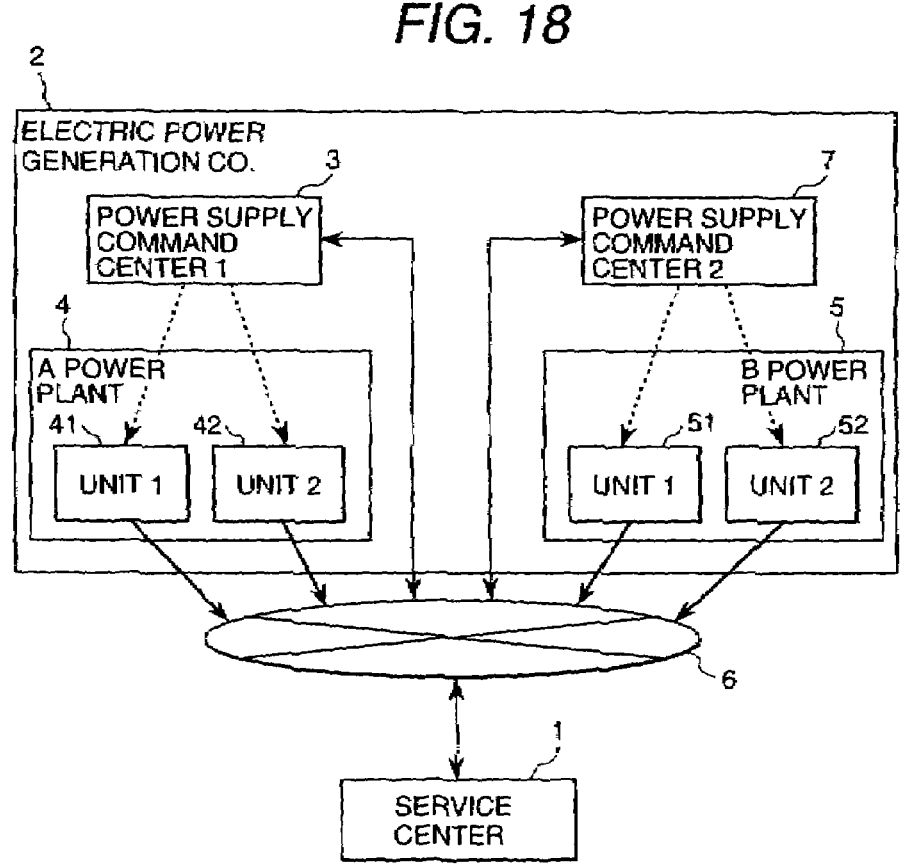
FIG. 18 is a block diagram showing a major constitution of a system for aiding in the preparation of an operation and maintenance plan for a power generation installation representing a third embodiment of the present invention.

FIG. 18 is a block diagram showing a major constitution of a system for aiding in the preparation of an operation and maintenance plan for a power generation installation representing a third embodiment of the present invention.

In the embodiment shown in FIG. 18, one power supply command center is provided for each of the power generation plants 4 and 5, in that a power supply command center 3 is provided for the power generation plant 4 and a power supply command center 7 is provided for the power generation plant 5. Further, in FIG. 18 the same or equivalent elements as those in FIG. 1 are denoted by the same reference numerals.

In the third embodiment, the service center 1 separately determines the power generation amount of the power generation units 41 and 42 which are under control of the power supply command center 3 and the power generation amount of the power generation units 51 and 52 which are under control of the power supply command center 7 in response to the power generation amount required by the respective power supply command centers 3 and 7 and being transmitted via the communication network 6, and transfers the determined result to the respective power supply command centers 3 and 7 via the communication network 6.

In this instance, since the rest of the operation of the system for a power generation installation of the third embodiment as shown in FIG. 18 is substantially the same as that of the system for a power generation installation of the first embodiment as has already been explained above, the explanation of the third embodiment is omitted.

Figure 19:
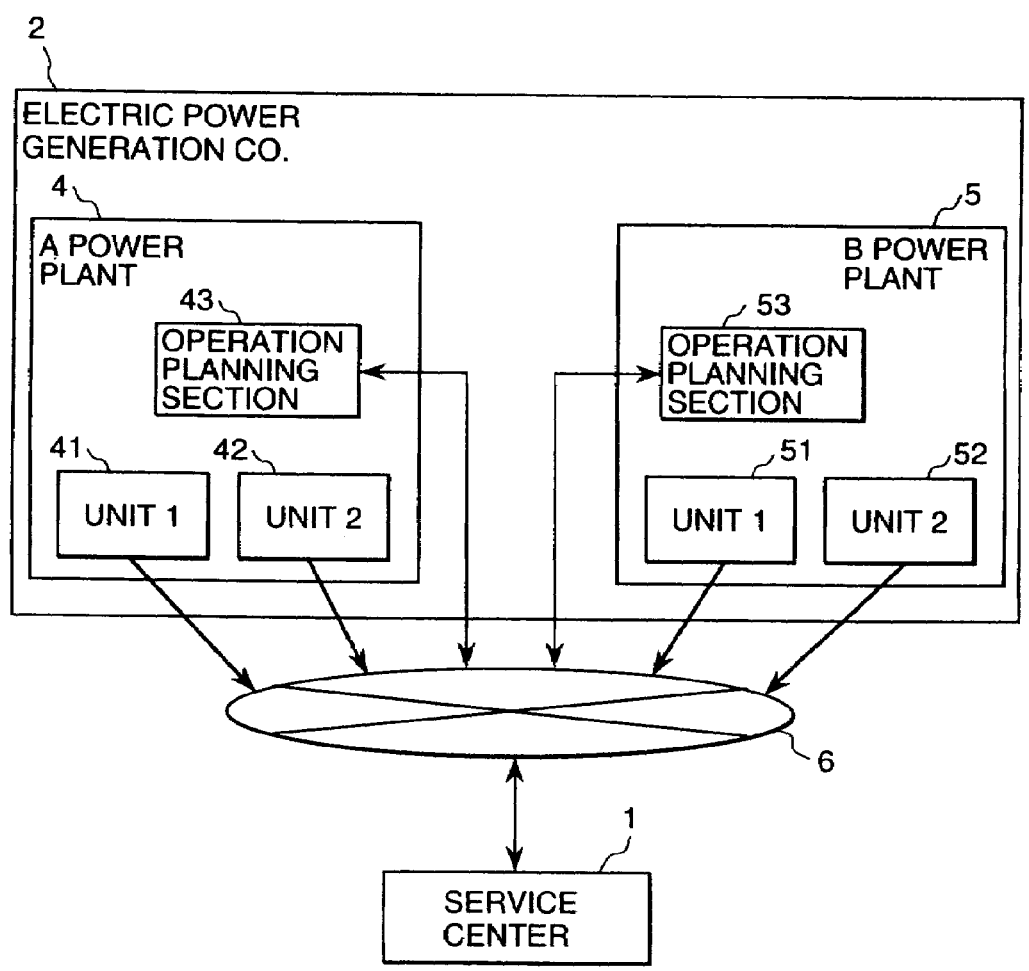
FIG. 19 is a block diagram showing a major constitution of a system for aiding in the preparation of an operation and maintenance plan for a power generation installation representing a fourth embodiment of the present invention.

FIG. 19 is a block diagram showing a major constitution of a system for aiding in the preparation of an operation and maintenance plan for a power generation installation representing a fourth embodiment of the present invention.

In the embodiment as shown in FIG. 19, no power supply command center is provided, instead thereof operation planning sections 43 and 53 are provided for the respective power generation plants 4 and 5. A power supply command center has a role to adjust power generation amount of power generation units under its control in response to power demand which varies moment by moment. In constant, in the present embodiment, the operation planning sections 43 and 53 function to operate the respective power generation units 41, 42, 51 and 52 according to a power generation plan determined in advance.

In this instance, since the rest of the operation of the operation and maintenance plan preparation aiding system for a power generation installation of the fourth embodiment as shown in FIG. 19 is substantially the same as that of the system for a power generation installation of the first embodiment as has already been explained above, the explanation of the operation of the fourth embodiment is omitted.

Figure 20:
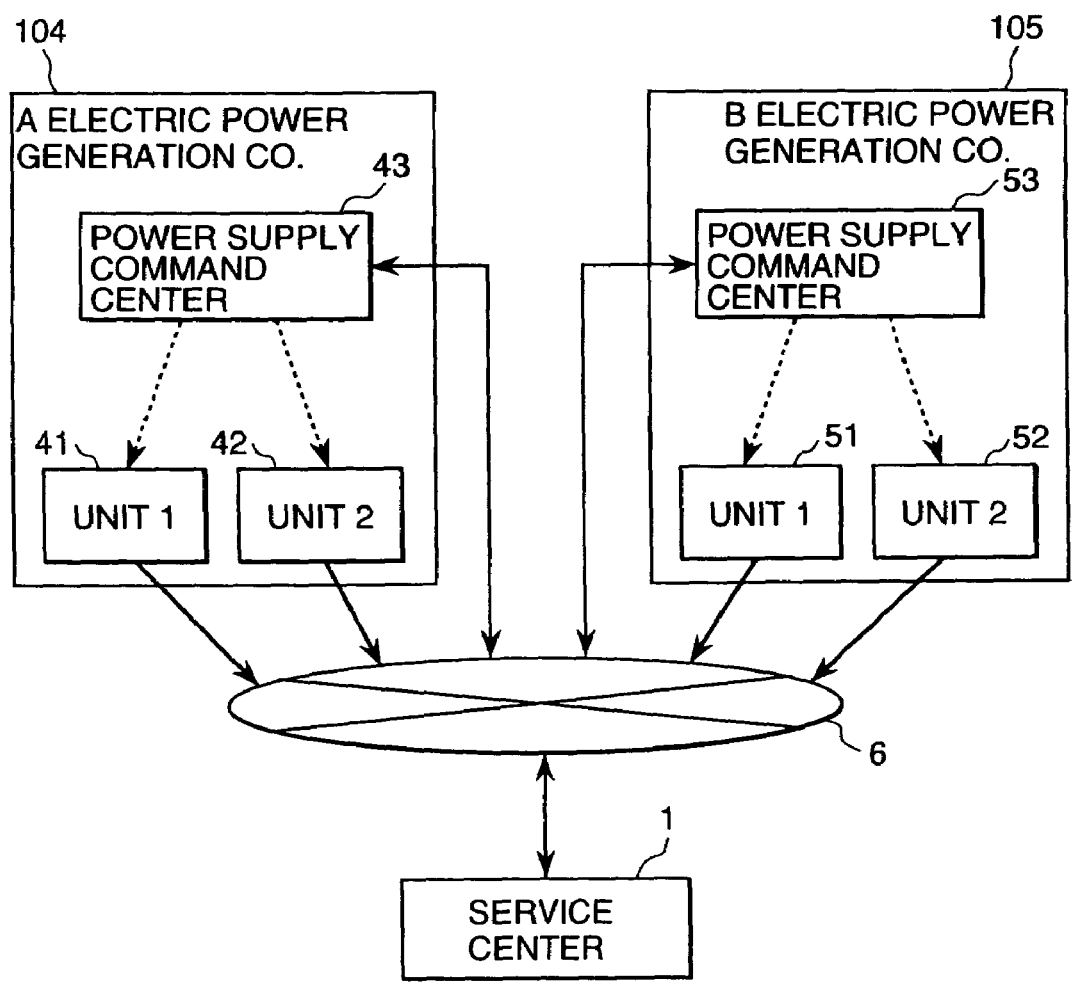
FIG. 20 is a block diagram showing a major constitution of a system for aiding in the preparation of an operation and maintenance plan for a power generation installation representing a fifth embodiment of the present invention.

FIG. 20 is a block diagram showing a major constitution of a system for aiding in the preparation of an operation and maintenance for a power generation installation representing a fifth embodiment of the present invention.

As shown in FIG. 20, the present operation and maintenance planning preparation aiding system for a power generation installation is constituted by a common service center 1 which performs the business of preparing an operation and maintenance plan, A electric power generation company 104 including two power generation units 41 and 42 and one power supply command center (central supply) 43, B electric power generation company 105 including two power generation units 51 and 52 and one power supply command center (central supply) 53 and a communication network 6 such as an internet. In the present embodiment, the service center 1, the power generation units 41 and 42, the power generation units 51 and 52 and the power supply command centers 43 and 54 are selectively connected to the communication network 6.

The A electric power generation company 104 requests the service center 1 the business of preparing an operation and maintenance plan for the owning power generation units 41 and 42 as well as the B electric power generation company 105 requests the service center 1 the business of preparing an operation and maintenance plan for the owning power generation units 51 and 52.

Respective exemplary constitutions of the power generation unit 41 and the common service center 1 as shown in FIG. 20 are the same as those shown in FIGS. 2 and 3.

FIG. 21 is a view for explaining storage contents of another process value database as shown in FIG. 3 and shows a structure of the process data.

As shown in FIG. 21, each of the process data is assigned a process number representing ID for discriminating process values for every power generation company and for every power generation unit and is managed according to the process number. In the present embodiment, the service center 1 obtains process data in a predetermined cycle from the respective power generation units 41, 42, 51 and 52 and in the present embodiment, as will be seen from the contents with regard to the time of the process data stored in the process value database 13, the service center 1 obtains the process data in a cycle of 1 sec.

The power supply command center 43 of A electric power generation company 104 and the power supply command center 53 of B electric power generation company 105 transmit a power amount required to be supplied by the owning power generation units 41, 42, 51 and 52 as respective power demand information to the service center 1 via the communication network 6. Since this power demand information varies over time depending on power demand, the information is transmitted in a predetermined cycle, for example, every 1 sec. to the service center 1. The service center 1 receives the power demand information via the fire wall 11 at the power demand amount receiving unit 23, and supplies the received power demand information to the operation plan evaluation unit 25. In this instance, the operation plan evaluation unit 25 distributes for each electric power generation company 104 and 105 power generation amounts for the respective power generation units 41, 42, 51 and 52 so that the summed value of the power generation amounts of the respective power generation unit 41, 42, 51 and 52 coincides with the required value, and supplies the distribution result to the operation plan information transmitting unit 24. The operation plan information transmitting unit 24 transmits the operation plan information, namely the power generation amount information distributed to the owning respective power generation units 41, 42, 51 and 52 for respective electric power generation companies 104 and 105, to the power supply command centers 43 and 53 via the communication network 6. The power supply command centers 43 and 53 confirm the contents of the operation plan information sent from the service center 1 and outputs the command values of the power generation amount for the owning respective power generation units 41, 42, 61 and 52 according to the operation plan information.

The explanation until now relates to the operation planning for the owning power generation units 41, 42, 51 and 52 for each electric power generation company 104 and 105 in response to power demand which varies over time in the operation and maintenance planning preparation aiding system for a power generation installation, however, other than operating the owning power generation units, it is sometimes true that the total cost for the operation and maintenance can be reduced if the electric power is supplied from the power generation units owned by the other, in such instance the operation plan information transmission unit 24 in the service center 1 transmits the determined operation plan to the respective power supply command centers 43 and 53 for the respective electric power generation companies 104 and 105, and, after receiving agreement from the respective electric power generation companies 104 and 105, finalizes the operation plan. Thereafter, the power supply command centers 43 and 53 of the respective electric power generator companies 104 and 105 output power generation amount command values according to the operation plan to the respective owning power generation units.

Hereinbelow, the role of the service center 1 performed for a plurality of electric power generation companies will be explained.

FIG. 22 is a view for explaining storage contents of another design information database 18 as shown in FIG. 3 and shows a structure of the design information data.

As shown in FIG. 22, the design information data are constituted for every electric power generation company by machines and apparatus and parts thereof constituting the respective power generation units and their supplying manufacturers and models for every machine, apparatus and part. For example, in the case of a first power generation unit (power generation unit 1) in A electric power generation company, a product of A company of type GT001 is employed as a gas turbine, and as parts constituting the gas turbine, a combustor of B company of type CB003, a turbine of A company of type TB001 and a compressor of A company of type CP001 are employed.

FIG. 23 is a view for explaining storage contents of another periodic inspection database 26, and shows a structure of the periodic inspection information data.

As shown in FIG. 23, the periodic inspection information data are information representing periodic inspection times already performed in the past and periodic inspection times to be performed in the future, and based on the periodic inspection information data the remaining days until the subsequent periodic inspection is calculated. The economic loss (L1) due to performance deterioration can be calculated by multiplying the estimated power generation amount (A D1) until the subsequent periodic inspection by the power generation cost increase component (C).

Because of performance deterioration of a power generation unit when the operation of the power generation unit is stopped, it is necessary to increase the power generation amount of another power generation unit and to ensure that the power generation amount meets the electric power demand. In such instance, the following may happen in that the power generation cost (fuel cost per unit electric power output) increases, a power generation unit which is not used usually has to be operated and electric power has to be purchased from another electric power generation company.

The operation plan evaluation unit 25 investigates a method of obtaining the necessary power generation amount not only by taking into account the power generation cost of a company that owns the power generation unit that has been stopped, but also the power generation cost of a power generation unit owned by another electric power generation company. As has been explained above, the service center 1 calculates the power generation cost in real time based on the process values obtained from the power generation units. When stopping a power generation unit, at first with regard to respective power generation units owned by itself and others, respective power generation units having capacity to increase the power generation amount and having the minimum power generation cost are searched. Subsequently, with regard to the power generation cost of the other company, a cost is calculated by adding a predetermined price on the power generation cost of its own company and the calculated cost is compared with the power generation cost of its own company. When the power generation cost of the other company is cheaper even in view of the added total price, it is determined that the electric power is to be purchased from the other company. Namely, the operation plan evaluation unit 25 prepares an operation plan so as to increase the power generation amount of the power generation unit of the other company. As has been explained above, with regard to the power generation amount adjustment between, for example, A electric power generation company 104 and B electric power generation company 105, the service center 1 transmits the operation plan to the respective electric power generation companies 104 and 105 via the communication network 6 and, after obtaining agreement from the electric power generation companies 104 and 105, the operation plan is authorized. With regard to the agreement of the electric power generation companies 104 and 105, the service center 1 confirms the same via the communication network 6.

Figure 27A:
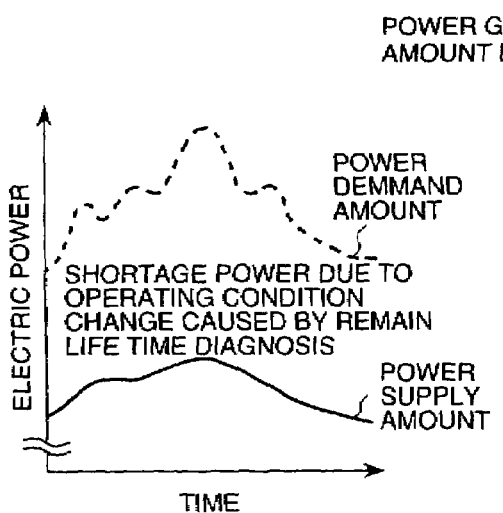
FIG. 27 is a characteristic diagram showing selection principle of power generation units.
Figure 27B:
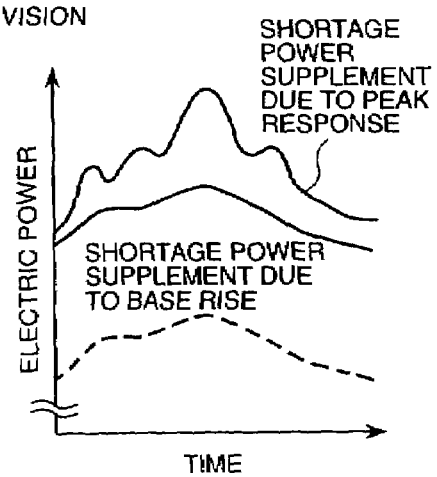

FIGS. 27(*a*) and 27(*b*) are characteristic diagrams showing a selection principle of the power generation units. Now, when the maximum power generation amount and the load adjustment amount of a certain power generation unit are decreased and if an electric power shortage as shown in FIG. 27(*a*) is caused, the electric power shortage is supplemented as shown in FIG. 27(*b*), while dividing the supplementing electric power into base increase and peak response. With regard to the base increase, a power generation unit with a low power generation cost is selected to increase the maximum power generation amount, and with regard to the peak response, a power generation unit having a longer remaining lifetime is selected to increase the load follow-up property.

In parallel with the above operation plan, the operation plan evaluation unit 25 prepares an operation plan in which another power generation unit having a higher power generation efficiency is positively selected for operation based on the power generation efficiency of the respective power generation units calculated in on-line. For example, as shown in FIG. 9, if the performance of a power generation unit is deteriorated, the power generation efficiency thereof is also reduced, therefore, a probability of operating such power generation unit is reduced. Then, the operation plan evaluation unit 25 prepares a maintenance plan for performing exchange of the machine and apparatus or the parts thereof for the power generation unit of which operation is judged to be stopped according to the remaining lifetime diagnosis result for the respective power generation units.

Generally, a power generation unit used for supplementing the power generation amount and the load adjustment is selected among the power generation units owned by itself, however, when such supplement can not be compensated by the power generation units commonly owned, an operation plan in which electric power is procured from the power generation units owned by another is prepared. In such instance, the price of the electric power is differentiated between a case wherein a predetermined amount of electric power is supplied for the base increase and a case wherein the supplied electric power varies depending on time for the peak response. Namely, with regard to the peak response, since the load is frequently varied which likely shortens the lifetime of the machine and apparatus or the parts thereof, therefore, the electric power price is determined by adding a predetermined value on the ordinary price.

The above explanation shows an example in which, when preparing an operation and maintenance plan for power generation units by making use of the remaining lifetime data, deterioration of the machine and apparatus or the parts thereof advances more than that estimated and the exchange timing is hastened. When preparing a usual operation and maintenance plan for power generation units, it is planned based on the remaining lifetime data to exchange the machine and apparatus or the parts thereof at the time of the periodic inspection, however, if the end of the remaining lifetime comes earlier than that estimated because of changes in operational circumstances, it is possible to prepare an operation plan which prevents usage of the machine and apparatus or the parts thereof exceeding their lifetime. Therefore, the operation and maintenance plan preparation aiding system for a power generation installation according to the present embodiment can avoid unpredictable circumstances which causes unplanned outage of the power generation unit due to an abnormality caused by the use of the machine and apparatus or the parts thereof exceeding their lifetimes, and can also avoid the economic loss caused by the unplanned outage of the power generation unit.

Contrary to the above example, an example can be prepared in which, based on remaining lifetime diagnosis result evaluated in real time, the exchange timing of the machine and apparatus or the parts thereof can be prolonged. For example, since a gas turbine is subjected to a high temperature and the deterioration thereof advances rapidly, an exchange standard time (for example, an accumulated operation time of 50,000 hours) is set in advance, and exchange of the machine and apparatus or the parts thereof is performed during the periodic inspection so as not to exceed the standard time. In such an instance, if the remaining lifetime of the machine and apparatus or the parts thereof remains long, it is not necessarily required to exchange the machine and apparatus or the parts thereof, when the standard time is reached and the exchange timing can be extended. In such an instance, in comparison with the exchange of the machine and apparatus or the parts thereof with reference to the standard time, the maintenance cost can be reduced.

Further, the service center 1 uses failure frequency of the machine and apparatus as one of the parameters for preparing an operation plan. Hereinbelow, the processing for calculating the failure frequency of the machine and apparatus will be explained.

In the service center 1, the failure frequency evaluation unit 21 evaluates the failure frequency of the machine and apparatus.

FIG. 24 is a view for explaining storage contents of another failure information database 16, and shows a structure of the failure information data.

As shown in FIG. 24, the failure information data show failure histories caused in the respective power generation units, for example, at the first power generation unit in power generation company A on Sep. 10, 2000 a packing deterioration in an A company manufactured valve of type VL 0010 was caused and the same was repaired and further it is indicated that the same valve was exchanged on Mar. 20, 1992. According to the contents of the failure information data, it is understood that the valve has failed after about eight years and six months of use. Similar information is indicated with regard to the pump in the second power generation unit in the power generation company B.

The failure frequency evaluation unit 21 evaluates the probability (once in how many years) of a failure of the respective machines and apparatuses or the parts thereof by making use of the data stored in the failure information database 16 and supplies the evaluation result to the operation plan evaluation unit 25.

As has been explained hitherto, although the operation and maintenance plan preparation aiding system for a power generation installation according to the present embodiment uses the performance diagnosis result, the remaining lifetime diagnosis result, the failure frequency and the priority of manufacturers when preparing an operation and maintenance plan for the respective power generation units for every electric power generation companies 104 and 105, it is cost advantageous if adjusting the power generation units owned by another company and procuring the electric power from the other, and an operation and maintenance plan over the plurality of electric power generation companies 104 and 105 is prepared.

When the electric power is procured from the other company, payment of the electric power fee between the electric power generation companies 104 and 105 is necessitated, however, the electric power procurement usually occurs mutually between the plurality of electric power generation companies 104 and 105, it will be unnecessary to pay the electric power fee at every procurement, and it will be sufficient if, after offsetting debits and credits for a predetermined period, for example, every one year, the balance is paid as the electric power fee.

In this instance, the service center 1 settles the agreement between these electric power generating companies 104 and 105 and prepares a plan so that the total costs for operation and maintenance of the respective electric power generation companies 104 and 105 are minimized.

Figure 25:
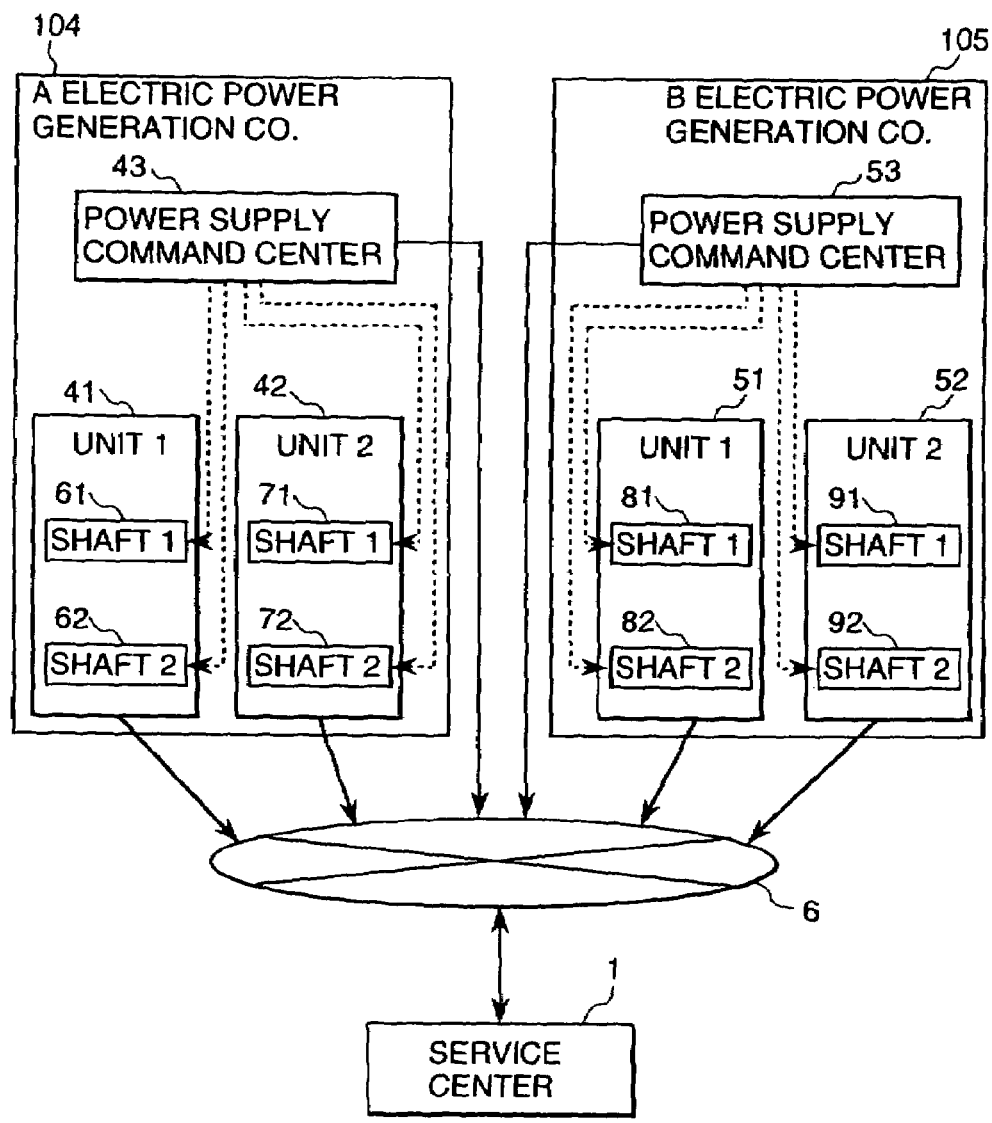
FIG. 25 is a block diagram showing a major constitution of a system for aiding in the preparation of an operation and maintenance plan for a power generation installation representing a sixth embodiment of the present invention.

FIG. 25 is a block diagram showing a major constitution of a system for aiding in the preparation of an operation and maintenance plan for a power generation installation representing a sixth embodiment of the present invention.

In the embodiment as shown in FIG. 25, the power generation unit 41 includes two shafts 61 and 62, the power generation unit 42 includes two shafts 71 and 72, the power generation unit 51 includes shafts 81 and 82 and the power generation unit 52 includes shafts 91 and 92, wherein the power generation amount in the respective power generation units 41, 42, 51 and 52 is adjusted for every shaft 61, 62, 71, 72, 81, 82, 91 and 92. Further, in FIG. 25 the same or equivalent elements as those in FIG. 20 are denoted by the same reference numerals.

In FIG. 25, the shafts 61, 62, 71, 72, 81, 82, 91 and 92 designate rotating shafts for transferring motive power of turbines to generators. Each of the power generation units 41, 42, 51 and 52 includes a plurality of generators and each of the plurality of generators is coupled with one or a plurality of turbines. For such power generation units 41, 42, 51 and 52, when the power generation amount is set for every shaft 61, 62, 71, 72, 81, 82, 91 and 92, namely for every generator, an extremely fine operation and maintenance plan can be prepared. For example, a plan can be prepared such that one of the plurality of shafts 61, 62, 71, 72, 81, 82, 91 and 92 constituting the power generation units 41, 42, 51 and 52 is stopped for operation and the operation of the other shafts is continued.

In this instance, since the rest of the operation of the operation and maintenance plan preparation aiding system for a power generation installation of the sixth embodiment as shown in FIG. 25 is substantially the same as that of the system for a power generation installation of the fifth embodiment as has already been explained above, the explanation of the operation of the sixth embodiment is omitted.

Figure 26:
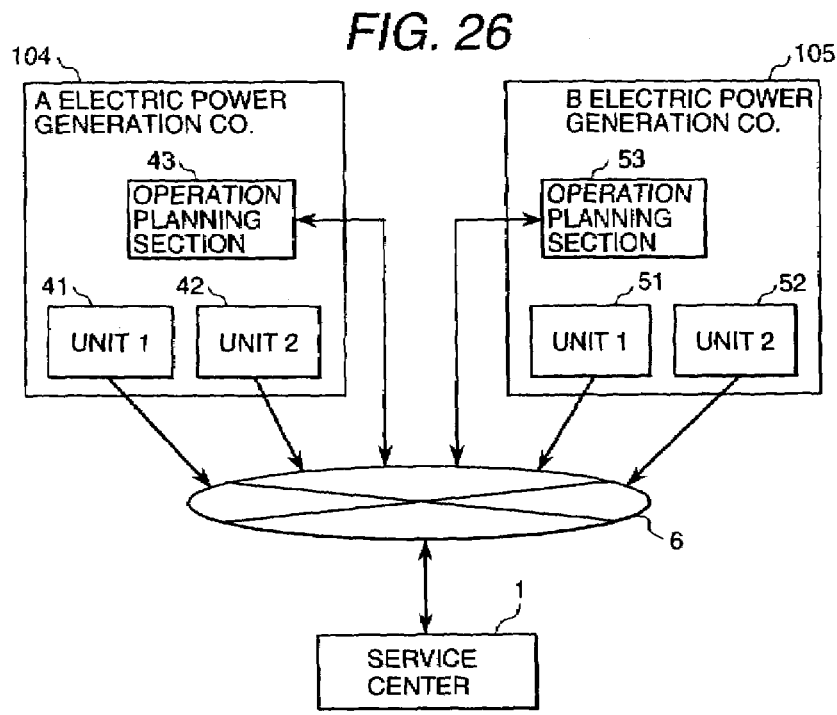
FIG. 26 is a block diagram showing a major constitution of a system for aiding in the preparation of an operation and maintenance plan for a power generation installation representing a seventh embodiment of the present invention.

FIG. 26 is a block diagram showing a major constitution of a system for aiding in the preparation of an operation and maintenance plan for a power generation installation representing a seventh embodiment of the present invention.

In the embodiment as shown in FIG. 26 no power supply command center is provided, instead thereof operation planning sections 43 and 53 are provided for the respective power generation companies 104 and 105. A power supply command center has a role to adjust the power generation amount of the power generation units under its control in response to power demand which varies moment by moment. In constant, in the present embodiment, the operation planning sections 43 and 53 function to operate the respective power generation units 41, 42, 51 and 52 according to a power generation plan determined in advance.

In this instance, since the rest of the operation of the operation and maintenance plan preparation aiding system for a power generation installation of the seventh embodiment as shown in FIG. 26 is substantially the same as that of the system for a power generation installation of the fifth embodiment as has already been explained above, the explanation of the operation of the seventh embodiment is omitted.

According to the first aspect of the present invention the following advantage is obtained, in that, since the operation and maintenance plans for the respective power generation units are prepared in the service center based on the power generation efficiency evaluated and calculated in real time, a secular change and a performance degradation due to failure occurrences for the respective power generation units can be taken into account, thereby, the operation cost thereof can be reduced in comparison with the conventional power generation system in which the operation and maintenance plans for the respective power generation units are prepared by making use of the plant data.

According to the second aspect of the present invention the following advantage is obtained, in that, when preparing the operation and maintenance plans for the respective power generation units in the service center based on the power generation efficiency evaluated and calculated in real time, since the cost of economical loss due to the performance degradation is calculated from the deviation value between the process value estimated using the machine and apparatus model and the measured value, the cost of economical loss is compared with the cost relating to the exchange of the machine and apparatus and the parts thereof and the operation and maintenance plan of the respective power generation units are prepared by making use of the comparison result, the total cost for the operation and maintenance can be reduced.

According to the third aspect of the present invention the following advantage is obtained, in that, when preparing the operation and maintenance plans for the respective power generation units in the service center based on the power generation efficiency evaluated and calculated in real time, since the operation and maintenance plans are prepared based on the calculated remaining lifetime, an exchange timing of the machine and apparatus and the parts thereof can be determined with a high accuracy in comparison with the conventional power generation system in which exchange of the machine and apparatus and the parts thereof is performed with reference to an accumulated operation time thereof, as a result, an abnormality occurrence due to the use of the machine and apparatus and the parts thereof exceeding their lifetime and generation of economical loss due to unplanned outages caused by an abnormality of the machine and apparatus and the parts thereof can be prevented, moreover, an exchange in every predetermined period of the machine and apparatus, even though there is a remaining lifetime, is unnecessitated, thereby, the maintenance cost can be reduced.

According to the fourth aspect of the present invention the following advantage is obtained, in that, when preparing the operation and maintenance plans for the respective power generation units in the service center based on the power generation efficiency evaluated and calculated in real time, since the operation condition for the machine and apparatus in its own power generation unit is modified based on the remaining lifetime of the machine and apparatus and the parts thereof not only in its own power generation unit but also in another power generation unit, the operation and maintenance plans can be prepared so that the total cost necessary for the operation and maintenance for the respective power generation units is minimized, the cost merit obtained by the electric power generation by the electric power generation company can be increased in comparison with the conventional power generation system.

What is claimed is:

1. A system for aiding the preparation of operation and maintenance plans for a power generation installation, comprising:
   means for obtaining plant data from a plurality of power generation units;
   means for determining deviation values between process values estimated according to a machine and apparatus model by making use of the obtained plant data and measured data for the every plurality of power generation units; and
   means for comparing between a cost of economical loss caused by a power generation efficiency reduction of the concerned power generation unit calculated from the determined deviation value and a cost relating to exchange of the machine and apparatus and the parts thereof in the concerned power generation unit.

2. A system for aiding the preparation of operation and maintenance plans for a power generation installation, comprising:
   means for obtaining plant data from a plurality of power generation units;
   means for estimating process values according to a machine and apparatus model by making use of the obtained plant data for the every plurality of power generation units;
   means for determining deviation values between the estimated values and measured values;
   means for calculating a cost of economical loss caused by a power generation efficiency reduction of the concerned power generation unit from the determined deviation value;
   means for comparing between the calculated cost of economical loss and a cost relating to exchange of the machine and apparatus and the parts thereof in the concerned power generation unit; and
   means for preparing operation and maintenance plans for the respective power generation units according to the comparison result.

3. A system for aiding the preparation of operation and maintenance plans for a power generation installation according to claim 1, wherein failure histories of the machine and apparatus or the parts thereof in the plurality of power generation units are stored in a database, a failure probability of the machine and apparatus or the parts thereof is calculated by making use of the failure histories stored in the database, and an operation and maintenance plan for each of the power generation units is prepared in view of the calculated failure probability.

4. A system for aiding the preparation of operation and maintenance plans for a power generation installation according to claim 2, wherein failure histories of the machine and apparatus or the parts thereof in the plurality of power generation units are stored in a database, a failure probability of the machine and apparatus or the parts thereof is calculated by making use of the failure histories stored in the database, and an operation and maintenance plan for each of the power generation units is prepared in view of the calculated failure probability.

5. A system for aiding the preparation of operation and maintenance plans for a power generation installation according to claim 1, wherein manufacturers of the machine and apparatus or the parts thereof in the plurality of power generation units and superiority with regard to reliability and maintenance capacity of the manufacturers are stored in a database and an operation and maintenance plan for each of the power generation units is prepared in view of the superiority of the manufacturers stored in the database when evaluating the machine and apparatus or the parts thereof.

6. A system for aiding the preparation of operation and maintenance plans for a power generation installation according to claim 2, wherein manufacturers of the machine and apparatus or the parts thereof in the plurality of power generation units and superiority with regard to reliability and maintenance capacity of the manufacturers are stored in a database and an operation and maintenance plan for each of the power generation units is prepared in view of the superiority of the manufacturers stored in the database when evaluating the machine and apparatus or the parts thereof.

7. A method of aiding the preparation of operation and maintenance plans for a power generation installation, the method comprising the acts of:

obtaining plant data from a plurality of power generation units;

estimating process values according to a machine and apparatus model by making use of the obtained plant data for the every plurality of power generation units;

determining deviation values between the estimated values and measured values;

calculating a cost of economical loss caused by a power generation efficiency reduction of the concerned power generation unit from the determined deviation value;

comparing between the calculated cost of economical loss and a cost relating to exchange of the machine and apparatus and the parts thereof in the concerned power generation unit; and preparing operation and maintenance plans for the respective power generation units according to the comparison result.

* * * * *